US012803639B2

(12) United States Patent
Hindy et al.

(10) Patent No.: US 12,803,639 B2
(45) Date of Patent: Nov. 17, 2026

(54) CODEBOOK STRUCTURE FOR RECIPROCITY-BASED TYPE-II CODEBOOK

(71) Applicant: Lenovo (Singapore) Pte. Ltd., New Tech Park (SG)

(72) Inventors: Ahmed Monier Ibrahim Saleh Hindy, Aurora, IL (US); Vijay Nangia, Woodridge, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 81 days.

(21) Appl. No.: 18/261,817

(22) PCT Filed: Jan. 14, 2022

(86) PCT No.: PCT/IB2022/050317
§ 371 (c)(1),
(2) Date: Jul. 17, 2023

(87) PCT Pub. No.: WO2022/153251
PCT Pub. Date: Jul. 21, 2022

(65) Prior Publication Data

US 2024/0146378 A1 May 2, 2024

Related U.S. Application Data

(60) Provisional application No. 63/138,385, filed on Jan. 15, 2021.

(51) Int. Cl.
*H04B 7/06* (2006.01)
*H04B 7/0417* (2017.01)
*H04B 7/0456* (2017.01)

(52) U.S. Cl.
CPC ......... *H04B 7/0639* (2013.01); *H04B 7/0417* (2013.01); *H04B 7/0456* (2013.01)

(58) Field of Classification Search
CPC .. H04B 7/0417; H04B 7/0456; H04B 7/0639; H04B 7/0658
See application file for complete search history.

(56) References Cited

U.S. PATENT DOCUMENTS 11,595,809 B2 * 2/2023 Guday .................... H04W 4/80
2018/0309490 A1 10/2018 Rahman et al.
(Continued)

OTHER PUBLICATIONS

PCT/IB2022/050317, "Notification of Transmittal of the International Search Report and the Written Opinion of the International Searching Authority, or the Declaration", International Searching Authority, Apr. 26, 2022, pp. 1-11.
(Continued)

*Primary Examiner* — David B Lugo
(74) *Attorney, Agent, or Firm* — Kunzler Needham & Hilton

(57) ABSTRACT

Various aspects of the present disclosure relate to codebook structure for reciprocity-based type-II codebook. One apparatus includes at least one memory and at least one processor that is configured to cause the apparatus to receive a channel state information ("CSI") reporting configuration, receive CSI reference signals ("CSI-RSs") corresponding to a set of CSI-RS ports, select a subset of CSI-RS ports of the set of CSI-RS ports, the subset of CSI-RS ports being common for a subset of layers of the set of one or more layers, and report an indication of the subset of CSI-RS ports of the set of CSI-RS ports in a CSI report, the indication having a form of a combinatorial function that corresponds to half of a number of CSI-RS ports of the set of CSI-RS ports.

20 Claims, 8 Drawing Sheets

(56) References Cited

U.S. PATENT DOCUMENTS

| | | | | |
|---|---|---|---|---|
| 2019/0044587 | A1 | 2/2019 | Rahman et al. | |
| 2023/0261714 | A1* | 8/2023 | Kim | H04B 7/0626 |
| 2024/0007164 | A1* | 1/2024 | Zhang | H04B 7/0626 |

OTHER PUBLICATIONS

Samsung et al., "WF on Type I and II CSI codebooks", 3GPP TSG-RAN WG1 #89 R1-1709232, May 15-19, 2017, pp. 1-24.
Lenovo et al., "CSI enhancements for mTRP and FDD reciprocity", 3GPP TSG RAN WG1 #102e R1-2005926, Aug. 17-28, 2020, pp. 1-8.
3GPP, "3rd Generation Partnership Project; Technical Specification Group Radio Access Network; NR; Physical layer procedures for control (Release 16)", 3GPP TS 38.213 V16.3.0, Sep. 2020, pp. 1-179.
3GPP, "3rd Generation Partnership Project; Technical Specification Group Radio Access Network; NR; Physical layer procedures for data (Release 16)", 3GPP TS 38.214 V16.3.0, Sep. 2020, pp. 1-166.
3GPP, "3rd Generation Partnership Project; Technical Specification Group Radio Access Network; NR; Radio Resource Control (RRC) protocol specification (Release 16)", 3GPP TS 38.331 V16.2.0, Sep. 2020, pp. 1-921.

* cited by examiner

```
-- ASN1START
-- TAG-CODEBOOKCONFIG-START

CodebookConfig ::=          SEQUENCE {
   codebookType                CHOICE {
                               [..................................]
   }
}

CodebookConfig-r16 ::=         SEQUENCE {
   codebookType                CHOICE {
                               [..................................]
   }
}

CodebookConfig-r17 ::=         SEQUENCE  {
   codebookType                CHOICE {
      Type2                    SEQUENCE {
         subType                  CHOICE {
            typeII-PortSelection-r17     SEQUENCE  {
                               [..................................]
         },
      numberOfPMI-SubbandsPerCQI-Subband-r17 INTEGER (1..4),
      paramCombination-r17                   INTEGER (1..8)
      }
   }
}

-- TAG-CODEBOOKCONFIG-STOP
-- ASN1STOP
```

FIG. 2

```
-- ASN1START
-- TAG-CSI-REPORTCONFIG-START

CSI-ReportConfig ::=                SEQUENCE {
    reportConfigId                       CSI-ReportConfigId,
    carrier                              ServCellIndex             OPTIONAL,    -- Need S
    resourcesForChannelMeasurement       CSI-ResourceConfigId,
    csi-IM-ResourcesForInterference      CSI-ResourceConfigId      OPTIONAL,    -- Need R
    nzp-CSI-RS-ResourcesForInterference  CSI-ResourceConfigId      OPTIONAL,    -- Need R

    reportConfigType                     CHOICE {
        periodic                             SEQUENCE {
            reportSlotConfig                 CSI-ReportPeriodicityAndOffset,
                pucch-CSI-ResourceList       SEQUENCE (SIZE (1..maxNrofBWPs)) OF PUCCH-CSI-Resource
        },
        semiPersistentOnPUCCH                SEQUENCE {
            reportSlotConfig                 CSI-ReportPeriodicityAndOffset,
            pucch-CSI-ResourceList           SEQUENCE (SIZE (1..maxNrofBWPs)) OF PUCCH-CSI-Resource
        },
        semiPersistentOnPUSCH                SEQUENCE {
            reportSlotConfig                 ENUMERATED {sl5, sl10, sl20, sl40, sl80, sl160, sl320},
            reportSlotOffsetList             SEQUENCE (SIZE (1.. maxNrofUL-Allocations)) OF INTEGER(0..32),
            P0alpha                              P0-PUSCH-AlphaSetId
        },
        Aperiodic                            SEQUENCE {
            reportSlotOffsetList             SEQUENCE (SIZE (1..maxNrofUL-Allocations)) OF INTEGER(0..32)
        }
    },
    channelReciprocity                       ENUMERATED (TRUE)     OPTIONAL,    -- Need R

                                               [..................................]

-- TAG-CSI-REPORTCONFIG-STOP
-- ASN1STOP
```

FIG. 3

```
-- ASN1START
-- TAG-CODEBOOKCONFIG-START

CodebookConfig ::=                    SEQUENCE {
   codebookType                          CHOICE {
                                      [.........................]
   }
}

CodebookConfig-r16 ::=                SEQUENCE {
   codebookType                          CHOICE {
                                      [.........................]
   }
}

CodebookConfig-r17 ::=                SEQUENCE {
   codebookType                          CHOICE {
      Type2                                 SEQUENCE {
         subType                               CHOICE {
            typeII-PortSelection-r17              SEQUENCE {
                                         [.........................]
               channelReciprocity           ENUMERATED (TRUE)      OPTIONAL,    -- Need R
         },
      numberOfPMI-SubbandsPerCQI-Subband-r17  INTEGER (1..4),
      paramCombination-r17                    INTEGER (1..8)
      }
   }
}

-- TAG-CODEBOOKCONFIG-STOP
-- ASN1STOP
```

FIG. 4

CODEBOOK STRUCTURE FOR RECIPROCITY-BASED TYPE-II CODEBOOK

CROSS-REFERENCE TO RELATED APPLICATIONS

This application claims priority to U.S. Provisional Patent Application No. 63/138,385 entitled "CODEBOOK STRUCTURE FOR RECIPROCITY-BASED TYPE-II CODEBOOK" and filed on Jan. 15, 2021, for Ahmed Monier Ibrahim Saleh Hindy, et al., which is incorporated herein by reference.

FIELD

The subject matter disclosed herein relates generally to wireless communications and more particularly relates to codebook structure for reciprocity-based type-II codebook.

BACKGROUND

In certain wireless communication systems, a User Equipment device ("UE") is able to connect with a fifth-generation ("5G") core network (i.e., "5GC") in a Public Land Mobile Network ("PLMN"). In wireless networks, channel state information may be transmitted between a UE and a wireless network.

BRIEF SUMMARY

Disclosed are procedures for codebook structure for reciprocity-based type-II codebook. Said procedures may be implemented by apparatus, systems, methods, and/or computer program products.

In one embodiment, a first apparatus includes a transceiver that receives a channel state information ("CSI") reporting configuration, the CSI reporting configuration comprising a codebook configuration corresponding to a port selection codebook, the port selection codebook corresponding to a precoding matrix indicator ("PMI") comprising a set of one or more layers. In one embodiment, the transceiver receives CSI reference signals ("CSI-RSs") corresponding to a set of CSI-RS ports. The first apparatus, in one embodiment, includes a processor that selects a subset of the CSI-RS ports, the selected subset of CSI-RS ports being common for a subset of the set of one or more layers. In one embodiment, the transceiver reports an indication of the selected subset of the set of CSI-RS ports in a CSI report to a mobile wireless communication network, the indication having a form of a combinatorial function that corresponds to half of the number of the set of CSI-RS ports.

In one embodiment, a first method includes receiving a channel state information ("CSI") reporting configuration, the CSI reporting configuration comprising a codebook configuration corresponding to a port selection codebook, the port selection codebook corresponding to a precoding matrix indicator ("PMI") comprising a set of one or more layers. In one embodiment, the first method includes receiving CSI reference signals ("CSI-RSs") corresponding to a set of CSI-RS ports. The first method, in one embodiment, includes selecting a subset of the CSI-RS ports, the selected subset of CSI-RS ports being common for a subset of the set of one or more layers. In one embodiment, the first method includes reporting an indication of the selected subset of the set of CSI-RS ports in a CSI report to a mobile wireless communication network, the indication having a form of a combinatorial function that corresponds to half of the number of the set of CSI-RS ports.

A second apparatus, in one embodiment, includes a transceiver that sends, to a user equipment ("UE"), a channel state information ("CSI") reporting configuration, the CSI reporting configuration comprising a codebook configuration corresponding to a port selection codebook, the port selection codebook corresponding to a precoding matrix indicator ("PMI") comprising a set of one or more layers. In one embodiment, the transceiver sends, to the UE, CSI reference signals ("CSI-RSs") corresponding to a set of CSI-RS ports. In one embodiment, the transceiver receives, from the UE, an indication of a selected subset of the set of CSI-RS ports in a CSI report, the indication having a form of a combinatorial function that corresponds to half of the number of the set of CSI-RS ports.

In one embodiment, a second method includes sending, to a user equipment ("UE"), a channel state information ("CSI") reporting configuration, the CSI reporting configuration comprising a codebook configuration corresponding to a port selection codebook, the port selection codebook corresponding to a precoding matrix indicator ("PMI") comprising a set of one or more layers. In one embodiment, the second method includes sending, to the UE, CSI reference signals ("CSI-RSs") corresponding to a set of CSI-RS ports. In one embodiment, the second method includes receiving, from the UE, an indication of a selected subset of the set of CSI-RS ports in a CSI report, the indication having a form of a combinatorial function that corresponds to half of the number of the set of CSI-RS ports.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 2 is a block diagram illustrating one embodiment of ASN.1 code for configuring the UE with a reciprocity-based type-II codebook;

FIG. 3 is a block diagram illustrating a second embodiment of ASN.1 code for configuring the UE with a reciprocity-based type-II codebook;

FIG. 4 is a block diagram illustrating a third embodiment of ASN.1 code for configuring the UE with a reciprocity-based type-II codebook;

DETAILED DESCRIPTION

Figure 1:
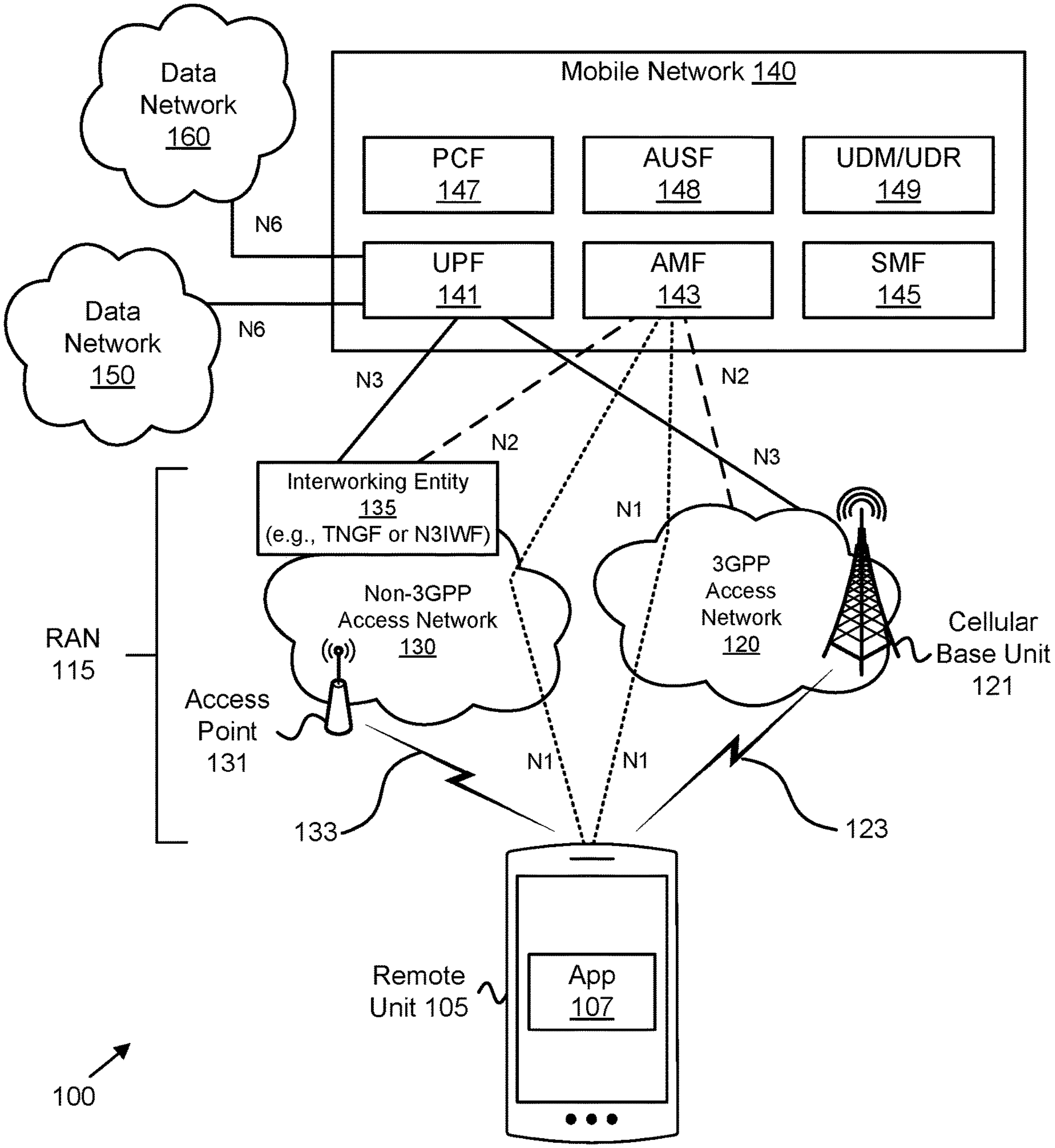
FIG. 1 is a schematic block diagram illustrating one embodiment of a wireless communication system for codebook structure for reciprocity-based type-II codebook.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for codebook structure for reciprocity-based type-II codebook. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

For 3GPP NR Release 16 ("Rel-16") Type-II codebook the number of Precoding Matrix Indicator ("PMI") bits fed back from the User Equipment ("UE") in the next-generation node-B ("gNB") via Uplink Control Information ("UCI") can be very large (>1000 bits at large bandwidth). In addition, the number of Channel State Information Reference Signals ("CSI-RS") ports sent in the downlink channel to enable channel estimation at the user equipment can be large as well, leading to higher system complexity and loss of resources over reference signaling. Thereby, further reduction of the PMI feedback bits and/or a reduction in the number of CSI-RS ports utilized is needed to improve efficiency.

A special case of the NR Rel-16 Type-II codebook (dubbed port-selection codebook) was proposed, in which the number of CSI-RS ports was reduced via applying an underlying spatial beamforming process. No insight onto how to design this beamforming process was provided. In addition, it has been recently discussed in the literature that the channel correlation between uplink and downlink channels can be exploited to reduce CSI feedback overhead, even in the Frequency-Division Duplexing ("FDD") mode where the Uplink ("UL")-Downlink ("DL") carrier frequency spacing is not too large. Also, two issues are expected to arise under DL channel estimation based on partial UL channel reciprocity under FDD mode. First, the UL channel estimated at the gNB may not be accurate due to conventional channel estimation issues that are well-known in the field of wireless communications, e.g., channel quantization and hardware impairments. Second, the channel may vary within the time between the transmission of the Sounding Reference Signals ("SRS") for UL CSI acquisition and the transmission of the beamformed CSI-RSs.

The aim of this disclosure is providing efficient CSI report structures for a given codebook, e.g., Type-II port-selection codebook, so as to minimize the CSI feedback overhead. In this disclosure, methods and systems are proposed to provide new structures for CSI reporting under FDD channel reciprocity. The proposed CSI report structures aim at achieving efficient tradeoff between the complexity of generating the CSI report and the amount of CSI feedback overhead, via providing efficient methods of reporting the port selection matrix, the quantized linear combination coefficient values, and the frequency domain basis indices. Note that in certain embodiments mathematical notation and/or operators used herein are the same or similar to the mathematical notation and/or operators used in TS 38.214.

FIG. 1 depicts a wireless communication system 100 for codebook structure for reciprocity-based type-II codebook, according to embodiments of the disclosure. In one embodiment, the wireless communication system 100 includes at least one remote unit 105, a Fifth-Generation Radio Access Network ("5G-RAN") 115, and a mobile core network 140. The 5G-RAN 115 and the mobile core network 140 form a mobile communication network. The 5G-RAN 115 may be composed of a 3GPP access network 120 containing at least one cellular base unit 121 and/or a non-3GPP access network 130 containing at least one access point 131. The remote unit 105 communicates with the 3GPP access network 120 using 3GPP communication links 123 and/or communicates with the non-3GPP access network 130 using non-3GPP communication links 133. Even though a specific number of remote units 105, 3GPP access networks 120, cellular base units 121, 3GPP communication links 123, non-3GPP access networks 130, access points 131, non-3GPP communication links 133, and mobile core networks 140 are depicted in FIG. 1, one of skill in the art will recognize that any number of remote units 105, 3GPP access networks 120, cellular base units 121, 3GPP communication links 123, non-3GPP access networks 130, access points 131, non-3GPP communication links 133, and mobile core networks 140 may be included in the wireless communication system 100.

In one implementation, the RAN 120 is compliant with the 5G system specified in the Third Generation Partnership Project ("3GPP") specifications. For example, the RAN 120 may be a NG-RAN, implementing NR RAT and/or LTE RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the cellular base units 121 in the 3GPP access network 120 via uplink ("UL") and downlink ("DL") communication signals. Furthermore, the UL and DL communication signals may be carried over the 3GPP communication links 123. Similarly, the remote units 105 may communicate with one or more access points 131 in the non-3GPP access network(s) 130 via UL and DL communication signals carried over the non-3GPP communication links 133. Here, the access networks 120 and 130 are intermediate networks that provide the remote units 105 with access to the mobile core network 140.

In some embodiments, the remote units 105 communicate with a remote host (e.g., in the data network 150 or in the data network 160) via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the 5G-RAN 115 (i.e., via the 3GPP access network 120 and/or non-3GPP network 130). The mobile core network 140 then relays traffic between the remote unit 105 and the remote host using the PDU session. The PDU session represents a logical connection between the remote unit 105 and a User Plane Function ("UPF") 141.

In order to establish the PDU session (or PDN connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. Additionally—or alternatively—the remote unit 105 may have at least one PDU session for communicating with the packet data network 160. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 131. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a Packet Gateway ("PGW", not shown) in the mobile core network 130. In certain embodiments, there is a one-to-one mapping between an EPS Bearer and a QoS profile, such that all packets belonging to a specific EPS Bearer have the same QoS Class Identifier ("QCI").

As described in greater detail below, the remote unit 105 may use a first data connection (e.g., PDU Session) established with the first mobile core network 130 to establish a second data connection (e.g., part of a second PDU session) with the second mobile core network 140. When establishing a data connection (e.g., PDU session) with the second mobile core network 140, the remote unit 105 uses the first data connection to register with the second mobile core network 140.

The cellular base units 121 may be distributed over a geographic region. In certain embodiments, a cellular base unit 121 may also be referred to as an access terminal, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a Home Node-B, a relay node, a device, or by any other terminology used in the art. The cellular base units 121 are generally part of a radio access network ("RAN"), such as the 3GPP access network 120, that may include one or more controllers communicably coupled to one or more corresponding cellular base units 121. These and other elements of radio access network are not illustrated but are well known generally by those having ordinary skill in the art. The cellular base units 121 connect to the mobile core network 140 via the 3GPP access network 120.

The cellular base units 121 may serve a number of remote units 105 within a serving area, for example, a cell or a cell sector, via a 3GPP wireless communication link 123. The cellular base units 121 may communicate directly with one or more of the remote units 105 via communication signals. Generally, the cellular base units 121 transmit DL communication signals to serve the remote units 105 in the time, frequency, and/or spatial domain. Furthermore, the DL communication signals may be carried over the 3GPP communication links 123. The 3GPP communication links 123 may be any suitable carrier in licensed or unlicensed radio spectrum.

The 3GPP communication links 123 facilitate communication between one or more of the remote units 105 and/or one or more of the cellular base units 121. Note that during NR operation on unlicensed spectrum (referred to as "NR-U"), the base unit 121 and the remote unit 105 communicate over unlicensed (i.e., shared) radio spectrum.

The non-3GPP access networks 130 may be distributed over a geographic region. Each non-3GPP access network 130 may serve a number of remote units 105 with a serving area. An access point 131 in a non-3GPP access network 130 may communicate directly with one or more remote units 105 by receiving UL communication signals and transmitting DL communication signals to serve the remote units 105 in the time, frequency, and/or spatial domain Both DL and UL communication signals are carried over the non-3GPP communication links 133. The 3GPP communication links 123 and non-3GPP communication links 133 may employ different frequencies and/or different communication protocols. In various embodiments, an access point 131 may communicate using unlicensed radio spectrum. The mobile core network 140 may provide services to a remote unit 105 via the non-3GPP access networks 130, as described in greater detail herein.

In some embodiments, a non-3GPP access network 130 connects to the mobile core network 140 via an interworking entity 135. The interworking entity 135 provides an interworking between the non-3GPP access network 130 and the mobile core network 140. The interworking entity 135 supports connectivity via the "N2" and "N3" interfaces. As depicted, both the 3GPP access network 120 and the interworking entity 135 communicate with the AMF 143 using a "N2" interface. The 3GPP access network 120 and interworking entity 135 also communicate with the UPF 141 using a "N3" interface. While depicted as outside the mobile core network 140, in other embodiments the interworking entity 135 may be a part of the core network. While depicted as outside the non-3GPP RAN 130, in other embodiments the interworking entity 135 may be a part of the non-3GPP RAN 130.

In certain embodiments, a non-3GPP access network 130 may be controlled by an operator of the mobile core network 140 and may have direct access to the mobile core network 140. Such a non-3GPP AN deployment is referred to as a "trusted non-3GPP access network." A non-3GPP access network 130 is considered as "trusted" when it is operated by the 3GPP operator, or a trusted partner, and supports certain security features, such as strong air-interface encryption. In contrast, a non-3GPP AN deployment that is not controlled by an operator (or trusted partner) of the mobile core network 140, does not have direct access to the mobile core network 140, or does not support the certain security features is referred to as a "non-trusted" non-3GPP access network. An interworking entity 135 deployed in a trusted non-3GPP access network 130 may be referred to herein as a Trusted Network Gateway Function ("TNGF"). An interworking entity 135 deployed in a non-trusted non-3GPP access network 130 may be referred to herein as a non-3GPP interworking function ("N3IWF"). While depicted as a part of the non-3GPP access network 130, in some embodiments the N3IWF may be a part of the mobile core network 140 or may be located in the data network 150.

In one embodiment, the mobile core network 140 is a 5G core ("5GC") or the evolved packet core ("EPC"), which may be coupled to a data network 150, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes at least one UPF ("UPF") 141. The mobile core network 140 also includes multiple control plane functions including, but not limited to, an Access and Mobility Management Function ("AMF") 143 that serves the 5G-RAN 115, a Session Management Function ("SMF") 145, a Policy Control Function ("PCF") 146, an Authentication Server Function ("AUSF") 147, a Unified Data Management ("UDM") and Unified Data Repository function ("UDR").

The UPF(s) 141 is responsible for packet routing and forwarding, packet inspection, QoS handling, and external PDU session for interconnecting Data Network ("DN"), in the 5G architecture. The AMF 143 is responsible for termination of NAS signaling, NAS ciphering & integrity protection, registration management, connection management, mobility management, access authentication and authorization, security context management. The SMF 145 is responsible for session management (i.e., session establishment, modification, release), remote unit (i.e., UE) IP address allocation & management, DL data notification, and traffic steering configuration for UPF for proper traffic routing.

The PCF 146 is responsible for unified policy framework, providing policy rules to CP functions, access subscription information for policy decisions in UDR. The AUSF 147 acts as an authentication server.

The UDM is responsible for generation of Authentication and Key Agreement ("AKA") credentials, user identification handling, access authorization, subscription management. The UDR is a repository of subscriber information and can be used to service a number of network functions. For example, the UDR may store subscription data, policy-related data, subscriber-related data that is permitted to be exposed to third party applications, and the like. In some embodiments, the UDM is co-located with the UDR, depicted as combined entity "UDM/UDR" 149.

In various embodiments, the mobile core network 140 may also include an Network Exposure Function ("NEF") (which is responsible for making network data and resources easily accessible to customers and network partners, e.g., via one or more APIs), a Network Repository Function ("NRF") (which provides NF service registration and discovery, enabling NFs to identify appropriate services in one another and communicate with each other over Application Programming Interfaces ("APIs")), or other NFs defined for the SGC. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. A network instance may be identified by a S-NSSAI, while a set of network slices for which the remote unit 105 is authorized to use is identified by NSSAI. In certain embodiments, the various network slices may include separate instances of network functions, such as the SMF and UPF 141. In some embodiments, the different network slices may share some common network functions, such as the AMF 143. The different network slices are not shown in FIG. 1 for ease of illustration, but their support is assumed.

Although specific numbers and types of network functions are depicted in FIG. 1, one of skill in the art will recognize that any number and type of network functions may be included in the mobile core network 140. Moreover, where the mobile core network 140 comprises an EPC, the depicted network functions may be replaced with appropriate EPC entities, such as an MME, S-GW, P-GW, HSS, and the like.

While FIG. 1 depicts components of a 5G RAN and a 5G core network, the described embodiments for using a pseudonym for access authentication over non-3GPP access apply to other types of communication networks and RATs, including IEEE 802.11 variants, GSM, GPRS, UMTS, LTE variants, CDMA 2000, Bluetooth, ZigBee, Sigfoxx, and the like. For example, in an 4G/LTE variant involving an EPC, the AMF 143 may be mapped to an MME, the SMF mapped to a control plane portion of a PGW and/or to an MME, the UPF 141 may be mapped to an SGW and a user plane portion of the PGW, the UDM/UDR 149 may be mapped to an HSS, etc.

As depicted, a remote unit 105 (e.g., a UE) may connect to the mobile core network (e.g., to a 5G mobile communication network) via two types of accesses: (1) via 3GPP access network 120 and (2) via a non-3GPP access network 130. The first type of access (e.g., 3GPP access network 120) uses a 3GPP-defined type of wireless communication (e.g., NG-RAN) and the second type of access (e.g., non-3GPP access network 130) uses a non-3GPP-defined type of wireless communication (e.g., WLAN). The 5G-RAN 115 refers to any type of 5G access network that can provide access to the mobile core network 140, including the 3GPP access network 120 and the non-3GPP access network 130.

As background, regarding the 3GPP NR Rd-15 Type-II Codebook, it is assumed that the gNB is equipped with a two-dimensional (2D) antenna array with $N_1$, $N_2$ antenna ports per polarization placed horizontally and vertically and communication occurs over $N_3$ PMI sub-bands. A PMI sub-band consists of a set of resource blocks, each resource block consisting of a set of subcarriers. In such case, $2N_1N_2$ CSI-RS ports are utilized to enable DL channel estimation with high resolution for NR Rd-15 Type-II codebook. In order to reduce the UL feedback overhead, a Discrete Fourier transform ("DFT")-based CSI compression of the spatial domain is applied to L dimensions per polarization, where $L<N_1N_2$. In the sequel the indices of the 2L dimensions are referred as the Spatial Domain ("SD") basis indices. The magnitude and phase values of the linear combination coefficients for each sub-band are fed back to the gNB as part of the CSI report. The $2N_1N_{2\times}N_3$ codebook per layer takes on the form $$W = W_1 W_2,$$

where $W_1$ is a $2N_1N_2\times 2L$ block-diagonal matrix ($L<N_1N_2$) with two identical diagonal blocks, i.e., $$W_1 = \begin{bmatrix} B & 0 \\ 0 & B \end{bmatrix},$$

and B is an $N_1N_2\times L$ matrix with columns drawn from a 2D oversampled DFT matrix, as follows.

$$u_m = \left[1 \; e^{j\frac{2\pi m}{O_2N_2}} \; \cdots \; e^{j\frac{2\pi m(N_2-1)}{O_2N_2}}\right],$$

$$v_{l,m} = \left[u_m \; e^{j\frac{2\pi l}{O_1N_1}} u_m \; \cdots \; e^{j\frac{2\pi l(N_1-1)}{O_1N_1}} u_m\right]^T,$$

$$B = \left[v_{l_0,m_0} \; v_{l_1,m_1} \; \cdots \; v_{l_{L-1},m_{L-1}}\right],$$

$$l_i = O_1n_1^{(i)} + q_1,\ 0 \le n_1^{(i)} < N_1,\ 0 \le q_1 < O_1 - 1,$$

$$m_i = O_2n_2^{(i)} + q_2,\ 0 \le n_2^{(i)} < N_2,\ 0 \le q_2 < O_2 - 1,$$

where the superscript $^T$ denotes a matrix transposition operation. Note that $O_1$, $O_2$ oversampling factors are assumed for the 2D DFT matrix from which matrix B is drawn. Note that $W_1$ is common across all layers. $W_2$ is a $2L\times N_3$ matrix, where the $i^{th}$ column corresponds to the linear combination coefficients of the 2L beams in the $i^{th}$ sub-band. Only the indices of the L selected columns of B are reported, along with the oversampling index taking on $O_1O_2$ values. Note that $W_2$ are independent for different layers.

For 4 antenna ports {3000, 3001, . . . , 3003}, 8 antenna ports {3000, 3001, . . . , 3007}, 12 antenna ports {3000, 3001, . . . , 3011}, 16 antenna ports {3000, 3001, . . . , 3015}, 24 antenna ports {3000, 3001, . . . , 3023}, and 32 antenna ports {3000, 3001, . . . , 3031}, and the UE configured with higher layer parameter codebookType set to 'typeII':

i. The values of $N_1$ and $N_2$ are configured with the higher layer parameter n1-n2-codebookSubsetRestriction. The supported configurations of ($N_1$, $N_2$) for a given number of CSI-RS ports and the corresponding values of ($O_1$, $O_2$) are given in Table 5.2.2.2.1-2. The number of CSI-RS ports, $P_{CSI\text{-}RS}$, is $2N_1N_2$.

ii. The value of L is configured with the higher layer parameter numberOfBeams, where L=2 when $P_{CSI\text{-}RS}=4$ and $L\in\{2,3,4\}$ when $P_{CSI\text{-}RS}>4$.

iii. The value of $N_{PSK}$ is configured with the higher layer parameter phaseAlphabetSize, where $N_{PSK}\in\{4,8\}$.

iv. The UE is configured with the higher layer parameter subbandAmplitude set to 'true' or 'false'.

v. The UE shall not report RI>2

When $v\le 2$, where v is the associated RI value, each PMI value corresponds to the codebook indices $i_1$ and $i_2$ where:

$$i_1 = \begin{cases} [i_{1,1}\ i_{1,2}\ i_{1,3,1}\ i_{1,4,1}] & v = 1 \\ [i_{1,1}\ i_{1,2}\ i_{1,3,1}\ i_{1,4,1}\ i_{1,3,2}\ i_{1,4,2}] & v = 2 \end{cases}$$

$$i_2 = \begin{cases} [i_{2,1,1}] & subbandAmplitude = \text{'false'}, v = 1 \\ [i_{2,1,1}\ i_{2,1,2}] & subbandAmplitude = \text{'false'}, v = 2 \\ [i_{2,1,1}\ i_{2,2,1}] & subbandAmplitude = \text{'true'}, v = 1 \\ [i_{2,1,1}\ i_{2,2,1}\ i_{2,1,2}\ i_{2,2,2}] & subbandAmplitude = \text{'true'}, v = 2 \end{cases}$$

The L vectors combined by the codebook are identified by the indices $i_{1,1}$ and $i_{1,2}$, where $$i_{1,1} = [q_1\ q_2]$$

$$q_1 \in \{0, 1, \ldots, O_1 - 1\}$$

$$q_2 \in \{0, 1, \ldots, O_2 - 1\}$$

$$i_{1,2} \in \left\{0, 1, \ldots, \binom{N_1 N_2}{L} - 1\right\}$$

Let $$n_1 = \left[n_1^{(0)}, \ldots, n_1^{(L-1)}\right]$$

$$n_2 = \left[n_2^{(0)}, \ldots, n_2^{(L-1)}\right]$$

$$n_1^{(i)} \in \{0, 1, \ldots, N_1 - 1\}$$

$$n_2^{(i)} \in \{0, 1, \ldots, N_2 - 1\}$$

And $$C(x, y) = \begin{cases} \binom{x}{y} & x \geq y \\ 0 & x < y \end{cases}$$

where the values of C(x,y) are given in Table 1. Then the elements of $n_1$ and $n_2$ are found from $i_{1,2}$ using the algorithm:

$s_{-1}=0$ for i=0, . . . , L−1

Find the largest $x^* \in \{L-1-i, \ldots, N_1N_2-1-i\}$ in Table 1 such that $i_{1,2}-s_{i-1} \geq C(x^*, L-i)$ $$e_i = C(x^*, L - i)$$

$$s_i = s_{i-1} + e_i$$

$$n^{(i)} = N_1 N_2 - 1 - x^*$$

$$n_1^{(i)} = n^{(i)} \bmod N_1$$

$$n_2^{(i)} = \frac{\left(n^{(i)} - n_1^{(i)}\right)}{N_1}$$

When $n_1$ and $n_2$ are known, $i_{1,2}$ is found using:

$n^{(i)}=N_1 n_2^{(i)}+n_1^{(i)}$ where the indices i=0, 1, . . . , L−1 are assigned such that $n^{(i)}$ increases as i increases $$i_{1,2} = \sum_{i=0}^{L-1} C\left(N_1 N_2 - 1 - n^{(i)}, L - i\right),$$

where C(x,y) is given in Table 1.

i. If $N_2=1$, $q_2=0$ and $n_2^{(i)}=0$ for i=0, 1, . . . , L−1, and $q_2$ is not reported.

ii. When $(N_1, N_2)=(2,1)$, $n_1=[0,1]$ and $n_2=[0,0]$, and $i_{1,2}$ is not reported.

iii. When $(N_1, N_2)=(4,1)$ and L=4, $n_1=[0,1,2,3]$ and $n_2=[0,0,0,0]$, and $i_{1,2}$ is not reported.

iv. When $(N_1, N_2)=(2,2)$ and L=4, $n_1=[0,1,0,1]$ and $n_2=[0,0,1,1]$, and $i_{1,2}$ is not reported.

TABLE 1

Combinatorial coefficients C(x, y)

| x | y = 1 | 2 | 3 | 4 |
|---|---|---|---|---|
| 0 | 0 | 0 | 0 | 0 |
| 1 | 1 | 0 | 0 | 0 |
| 2 | 2 | 1 | 0 | 0 |
| 3 | 3 | 3 | 1 | 0 |
| 4 | 4 | 6 | 4 | 1 |
| 5 | 5 | 10 | 10 | 5 |
| 6 | 6 | 15 | 20 | 15 |
| 7 | 7 | 21 | 35 | 35 |
| 8 | 8 | 28 | 56 | 70 |
| 9 | 9 | 36 | 84 | 126 |
| 10 | 10 | 45 | 120 | 210 |
| 11 | 11 | 55 | 165 | 330 |
| 12 | 12 | 66 | 220 | 495 |
| 13 | 13 | 78 | 286 | 715 |
| 14 | 14 | 91 | 364 | 1001 |
| 15 | 15 | 105 | 455 | 1365 |

The strongest coefficient on layer l=1, . . . , v is identified by $i_{1,3,l} \in \{0,1, \ldots, 2L-1\}$.

The amplitude coefficient indicators $i_{1,4,l}$ and $i_{2,2,l}$ are $$i_{1,4,l} = \left[k_{l,0}^{(1)}, k_{l,1}^{(1)}, \ldots, k_{l,2L-1}^{(1)}\right]$$

$$i_{2,2,l} = \left[k_{l,0}^{(2)}, k_{l,1}^{(2)}, \ldots, k_{l,2L-1}^{(2)}\right]$$

$$k_{l,i}^{(1)} \in \{0, 1, \ldots, 7\}$$

$$k_{l,i}^{(2)} \in \{0, 1\}$$

for l=1, . . . , v. The mapping from $$k_{l,i}^{(1)}$$

to the amplitude coefficient $$p_{l,i}^{(1)}$$

is given in Table 2 and the mapping from $$k_{l,i}^{(2)}$$

to the amplitude coefficient $$p_{l,i}^{(2)}$$

is given in Table 3. The amplitude coefficients are represented by $$p_l^{(1)} = \left[p_{l,0}^{(1)}, p_{l,1}^{(1)}, \dots, p_{l,2L-1}^{(1)}\right]$$

$$p_l^{(2)} = \left[p_{l,0}^{(2)}, p_{l,1}^{(2)}, \dots, p_{l,2L-1}^{(2)}\right]$$

for l=1, . . . , v.

TABLE 2

Mapping of elements of $i_{1,4,l}$: $k_{l,i}^{(1)}$ to $p_{l,i}^{(1)}$

| $k_{l,i}^{(1)}$ | $p_{l,i}^{(1)}$ |
|---|---|
| 0 | 0 |
| 1 | $\sqrt{1/64}$ |
| 2 | $\sqrt{1/32}$ |
| 3 | $\sqrt{1/16}$ |
| 4 | $\sqrt{1/8}$ |
| 5 | $\sqrt{1/4}$ |
| 6 | $\sqrt{1/2}$ |
| 7 | 1 |

TABLE 3

Mapping of elements of $i_{2,2,l}$: $k_{l,i}^{(2)}$ to $p_{l,i}^{(2)}$

| $k_{l,i}^{(2)}$ | $p_{l,i}^{(2)}$ |
|---|---|
| 0 | $\sqrt{1/2}$ |
| 1 | 1 |

The phase coefficient indicators are $$i_{2,1,l} = [c_{l,0}, c_{l,1}, \dots, c_{l,2L-1}]$$

for l=1, . . . , v.

The amplitude and phase coefficient indicators are reported as follows:

i. The indicators $$k_{l,i_{1,3,l}}^{(1)} = 7,$$

$$k_{l,i_{1,3,l}}^{(2)} = 1,$$

and $c_{l,i_{1,3,l}}=0$(l=1, . . . , v).

$$k_{l,i_{1,3,l}}^{(1)}, k_{l,i_{1,3,l}}^{(2)},$$

and $c_{l,i_{1,3,l}}$ are not reported for l=1, . . . , v.

ii. The remaining 2L−1 elements of $i_{1,4,l}$(l=1, . . . , v) are reported, where $$k_{l,i}^{(1)} \in \{0, 1, \dots, 7\}.$$

Let $M_l$(l=1, . . . , v) be the number of elements of $i_{1,4,l}$ that satisfy $$k_{l,i}^{(1)} > 0.$$

iii. The remaining 2L−1 elements of $i_{2,1,l}$ and $i_{2,2,l}$ (l=1, . . . , v)) are reported as follows:

iv. When subbandAmplitude is set to 'false',

1.

$$k_{l,i}^{(2)} = 1 \text{ for } l = 1, \dots, v, \text{ and } i = 0, 1, \dots, 2L-1.$$

$i_{2,1,l}$ is not reported for l=1, . . . , v.

2. For l=1, . . . , v, the elements of $i_{2,1,l}$ corresponding to the coefficients that satisfy $$k_{l,i}^{(1)} > 0,\ i \neq i_{1,3,l},$$

as determined by the reported elements of $i_{1,4,l,}$ are reported, where $c_{l,i} \in \{0, 1, \dots, N_{PSK}-1\}$ and the remaining 2L−$M_l$ elements of $i_{2,1,l}$ are not reported and are set to $c_{l,i}=0$.

v. When subbandAmplitude is set to 'true',

1. For l=1, . . . , v, the elements of $i_{2,2,l}$ and $i_{2,1,l}$ corresponding to the min($_l$, $K^{(2)}$)−1 strongest coefficients (excluding the strongest coefficient indicated by $i_{1,3,l}$), as determined by the corresponding reported elements of $i_{1,4,l}$ are reported, where $$k_{l,i}^{(2)} \in \{0, 1\} \text{ and } c_{l,i} \in \{0, 1, \dots, N_{PSK}-1\}.$$

The values of $K^{(2)}$ are given in Table 4. The remaining 2L−min($M_l K^{(2)}$) elements of $i_{2,2,l}$ are not reported and are set to $$k_{l,i}^{(2)} = 1.$$

The elements of $i_{2,1,l}$ corresponding to the $M_l$−min($M_l K^{(2)}$) weakest non-zero coefficients are reported, where $c_{l,i} \in \{0,1,2,3\}$. The remaining 2L−$M_l$ elements of $i_{2,1,l}$ are not reported and are set to $c_l$,i=0.

vi. When two elements, $$k_{l,x}^{(1)} \text{ and } k_{l,y}^{(1)},$$

of the reported elements of $i_{1,4,l}$ are identical $$\left(k_{l,x}^{(1)} = k_{l,y}^{(1)}\right),$$

then element min(x,y) is prioritized to be included in the set of the min($M_l K^{(2)}$)−1 strongest coefficients for $i_{2,1,l}$ and $i_{2,2,l}$(l=1, . . . , v) reporting.

TABLE 4

| Full resolution sub-band coefficients when subbandAmplitude is set to 'true' | |
|---|---|
| L | $K^{(2)}$ |
| 2 | 4 |
| 3 | 4 |
| 4 | 6 |

The codebooks for 1-2 layers are given in Table 5, where the indices $m_1^{(i)}$ and $m_2^{(i)}$ are given by $$m_1^{(i)} = O_1 n_1^{(i)} + q_1$$

$$m_2^{(i)} = O_2 n_2^{(i)} + q_2$$

For i=0,1, . . . , L−1, and the quantities $\varphi_{l,i}$, $u_m$, and $v_{l,m}$ are given by $$\varphi_{l,i} = \begin{cases} e^{j2\pi c_{l,i}/N_{PSK}} & subbandAmplitude = \text{'false'} \\ e^{j2\pi c_{l,i}/N_{PSK}} & subbandAmplitude = \text{'true'}, \min(M_l, K^{(2)}) \text{ strongest coefficients (including } i_{1,3,l}) \text{ with } k_{l,i}^{(1)} > 0 \\ e^{j2\pi c_{l,i}/4} & subbandAmpplitude = \text{'true'}, M_l - \min(M_l, K^{(2)}) \text{ weakest coefficients with } k_{l,i}^{(1)} > 0 \\ 1 & subbandAmplitude = \text{'true'}, 2L - M_l \text{ coefficients with } k_{l,i}^{(1)} = 0 \end{cases}$$

$$u_m = \begin{cases} \left[1 \;\; e^{j\frac{2\pi m}{O_2 N_2}} \;\; \cdots \;\; e^{j\frac{2\pi m(N_2-1)}{O_2 N_2}}\right] & N_2 > 1 \\ 1 & N_2 = 1 \end{cases}$$

$$v_m = \left[u_m \;\; e^{j\frac{2\pi l}{O_1 N_1}} u_m \;\; \cdots \;\; e^{j\frac{2\pi l(N_1-1)}{O_1 N_1}} u_m\right]^T$$

TABLE 5

| Codebook for 1-layer and 2-layer CSI reporting using antenna ports 3000 to 2999 + PCSI-RS | |
|---|---|
| Layers | |
| υ = 1 | $W^{(1)}_{q_1,q_2,n_1,n_2,p_1^{(1)},p_1^{(2)},i_{2,1,1}} = W^{1}_{q_1,q_2,n_1,n_2,p_1^{(1)},p_1^{(2)},i_{2,1,1}}$ |
| υ = 2 | $W^{(2)}_{q_1,q_2,n_1,n_2,p_1^{(1)},p_1^{(2)},i_{2,1,1},p_2^{(1)},p_2^{(2)},i_{2,1,2}} = \frac{1}{\sqrt{2}}\left[W^{1}_{q_1,q_2,n_1,n_2,p_1^{(1)},p_1^{(2)},i_{2,1,1}} \;\; W^{2}_{q_1,q_2,n_1,n_2,p_2^{(1)},p_2^{(2)},i_{2,1,2}}\right]$ |
| where $W^l_{q_1,q_2,n_1,n_2,p_l^{(1)},p_l^{(2)},c_l} = \frac{1}{\sqrt{N_1 N_2 \sum_{i=0}^{2L-1}\left(p_{l,i}^{(1)} p_{l,i}^{(2)}\right)^2}} \begin{bmatrix} \sum_{i=0}^{L-1} v_{m_1^{(i)},m_2^{(i)}} p_{l,i}^{(1)} p_{l,i}^{(2)} \varphi_{l,i} \\ \sum_{i=0}^{L-1} v_{m_1^{(i)},m_2^{(i)}} p_{l,i+L}^{(1)} p_{l,i+L}^{(2)} \varphi_{l,i+L} \end{bmatrix}$, $l = 1, 2,$ | |
| and the mappings from $i_1$ to $q_1$, $q_2$, $n_1$, $n_2$, $p_1^{(1)}$, and $p_2^{(1)}$, and from $i_2$ to $i_{2,1,1}$, $i_{2,1,2}$, $p_1^{(2)}$ and $p_2^{(2)}$ are as described above, including the ranges of the constituent indices of $i_1$ and $i_2$. | |

When the UE is configured with higher layer parameter codebookType set to 'typeII', the bitmap parameter typeII-RI-Restriction forms the bit sequence $r_1$, $r_0$ where $r_0$ is the LSB and $r_1$ is the MSB. When $r_i$ is zero, $i \in \{0,1\}$, PMI and RI reporting are not allowed to correspond to any precoder associated with v=i+1 layers. The bitmap parameter n1-n2-codebookSubsetRestriction forms the bit sequence $B=B_1B_2$ where bit sequences $B_1$, and $B_2$ are concatenated to form B. To define $B_1$ and $B_2$, first define the $O_1O_2$ vector groups $G(r_1,r_2)$ as $$G(r_1, r_2) = \{v_{N_1 r_1 + x_1, N_2 r_2 + x_2} : x_1 = 0, 1, \ldots, N_1 - 1; x_2 = 0, 1, \ldots, N_2 - 1\}$$

for $$r_1 \in \{0, 1, \ldots, O_1 - 1\}$$

$$r_2 \in \{0, 1, \ldots, O_2 - 1\}.$$

The UE shall be configured with restrictions for 4 vector groups indicated by $(r_1^{(k)}, r_2^{(k)})$ for k=0,1,2,3 and identified by the group indices $$g^{(k)} = O_1 r_2^{(k)} + r_1^{(k)}$$

For k=0,1, . . . , 3, where the indices are assigned such that $g^{(k)}$ increases as k increases. The remaining vector groups are not restricted.

i. If $N_2=1$, $g^{(k)}=k$ for k=0,1, . . . , 3, and $B_1$ is empty.
ii. If $N_2>1$, $B_1=b_1^{(10)} \ldots b_1^{(0)}$ is the binary representation of the integer $\beta_1$ where $b_1^{(10)}$ is the MSB and $b_1^{(0)}$ is the LSB. $\beta_1$ is found using:

$$\beta_1 = \sum_{k=0}^{3} C\left(O_1 O_2 - 1 - g^{(k)}, 4 - k\right),$$

where C(x,y) is defined in Table 1. The group indices g(k) and indicators $(r_1^{(k)}, r_2^{(k)})$ for k=0,1,2,3 may be found from $\beta_1$ using the algorithm:

$s_{-1}=0$ for k=0, . . . , 3

Find the largest $x^* \in \{3-k, \ldots, O_1O_2-1-k\}$ such that $\beta_1 - s_{k-1} \geq C(x^*, 4-k)$ $$e_k = C(x^*, 4-k)$$

$$s_k = s_{k-1} + e_k$$

$$g^{(k)} = O_1 O_2 - 1 - x^*$$

$$r_1^{(k)} = g^{(k)} \bmod O_1$$

$$r_2^{(k)} = \frac{\left(g^{(k)} - r_1^{(k)}\right)}{O_1}$$

The bit sequence $B_2 = B_2^{(0)} B_2^{(1)} B_2^{(2)} B_2^{(3)}$ is the concatenation of the bit sequences $B_2^{(k)}$ for k=0,1, . . . , 3, corresponding to the group indices $g^{(k)}$. The bit sequence $B_2^{(k)}$ is defined as:

$$B_2^{(k)} = b_2^{(k, 2N_1N_2-1)} \ldots b_2^{(k,0)}$$

Bits $$b_2^{(k,2(N_1x_2+x_1)+1)} b_2^{(k,2(N_1x_2+x_1))}$$

indicate the maximum allowed amplitude coefficient $p_{l,i}^{(1)}$ for the vector in group $g^{(k)}$ indexed by $x_1, x_2$, where the maximum amplitude coefficients are given in Table 6. A UE that does not report parameter amplitudeSubsetRestriction='supported' in its capability signaling is not expected to be configured with $$b_2^{(k,2(N_1x_2+x_1)+1)} b_2^{(k,2(N_1x_2+x_1))} = 01 \text{ or } 10.$$

TABLE 6

Maximum allowed amplitude coefficients for restricted vectors

| Bits $b_2^{(k,2(N_1x_2+x_1)+1)} b_2^{(k,2(N_1x_2+x_1))}$ | Maximum Amplitude Coefficient $p_{l,i}^{(1)}$ |
|---|---|
| 00 | 0 |
| 01 | $\sqrt{1/4}$ |
| 10 | $\sqrt{1/2}$ |
| 11 | 1 |

Regarding NR Rel. 15 Type-II port selection codebook, only K (where $K \leq 2N_1N_2$) beamformed CSI-RS ports are utilized in DL transmission, in order to reduce complexity. The $K \times N_3$ codebook matrix per layer takes on the form:

$$W = W_1^{PS} W_2$$

Here, $W_2$ follows the same structure as the conventional NR Rel-15 Type-II Codebook, and are layer specific.

$$W_1^{PS}$$

is a K×2L block-diagonal matrix with two identical diagonal blocks, i.e., $$W_1^{PS} = \begin{bmatrix} E & 0 \\ 0 & E \end{bmatrix},$$

and E is an $$\frac{K}{2} \times L$$

matrix whose columns are standard unit vectors, as follows.

$$E = \left[ e^{(K/2)}_{mod(m_{PS}d_{PS}, K/2)} \quad e^{(K/2)}_{mod(m_{PS}d_{PS}+1, K/2)} \quad \cdots \quad e^{(K/2)}_{mod(m_{PS}d_{PS}+L-1, K/2)} \right],$$

where $$e_i^{(K)}$$

is a standard unit vector with a 1 at the $i^{th}$ location. Here $d_{PS}$ is an RRC parameter which takes on the values {1,2,3,4} under the condition $d_{PS} \leq \min(K/2, L)$, whereas $m_{PS}$ takes on the values $$\left\{0, \ldots, \left\lceil \frac{K}{2d_{PS}} \right\rceil - 1\right\}$$

and is reported as part of the UL CSI feedback overhead. $W_1$ is common across all layers.

For K=16, L=4 and $d_{PS}=1$, the 8 possible realizations of E corresponding to $m_{PS}=\{0,1, \ldots, 7\}$ are as follows $$\begin{bmatrix} 1&0&0&0\\0&1&0&0\\0&0&1&0\\0&0&0&1\\0&0&0&0\\0&0&0&0\\0&0&0&0\\0&0&0&0 \end{bmatrix}, \begin{bmatrix} 0&0&0&0\\1&0&0&0\\0&1&0&0\\0&0&1&0\\0&0&0&1\\0&0&0&0\\0&0&0&0\\0&0&0&0 \end{bmatrix}, \begin{bmatrix} 0&0&0&0\\0&0&0&0\\1&0&0&0\\0&1&0&0\\0&0&1&0\\0&0&0&1\\0&0&0&0\\0&0&0&0 \end{bmatrix}, \begin{bmatrix} 0&0&0&0\\0&0&0&0\\0&0&0&0\\1&0&0&0\\0&1&0&0\\0&0&1&0\\0&0&0&1\\0&0&0&0 \end{bmatrix},$$

-continued $$\begin{bmatrix}0&0&0&0\\0&0&0&0\\0&0&0&0\\0&0&0&0\\1&0&0&0\\0&1&0&0\\0&0&1&0\\0&0&0&1\end{bmatrix},\begin{bmatrix}0&0&0&1\\0&0&0&0\\0&0&0&0\\0&0&0&0\\0&0&0&0\\1&0&0&0\\0&1&0&0\\0&0&1&0\end{bmatrix},\begin{bmatrix}0&0&1&0\\0&0&0&1\\0&0&0&0\\0&0&0&0\\0&0&0&0\\0&0&0&0\\1&0&0&0\\0&1&0&0\end{bmatrix},\begin{bmatrix}0&1&0&0\\0&0&1&0\\0&0&0&1\\0&0&0&0\\0&0&0&0\\0&0&0&0\\0&0&0&0\\1&0&0&0\end{bmatrix}.$$

When $d_{PS}=2$, the 4 possible realizations of E corresponding to $m_{PS}=[0,1,2,3]$ are as follows $$\begin{bmatrix}1&0&0&0\\0&1&0&0\\0&0&1&0\\0&0&0&1\\0&0&0&0\\0&0&0&0\\0&0&0&0\\0&0&0&0\end{bmatrix},\begin{bmatrix}0&0&0&0\\0&0&0&0\\1&0&0&0\\0&1&0&0\\0&0&1&0\\0&0&0&1\\0&0&0&0\\0&0&0&0\end{bmatrix},\begin{bmatrix}0&0&0&0\\0&0&0&0\\0&0&0&0\\0&0&0&0\\1&0&0&0\\0&1&0&0\\0&0&1&0\\0&0&0&1\end{bmatrix},\begin{bmatrix}0&0&1&0\\0&0&0&1\\0&0&0&0\\0&0&0&0\\0&0&0&0\\0&0&0&0\\1&0&0&0\\0&1&0&0\end{bmatrix}.$$

When $d_{PS}=3$, the 3 possible realizations of E corresponding of $m_{PS}=\{0,1,2\}$ are as follows $$\begin{bmatrix}1&0&0&0\\0&1&0&0\\0&0&1&0\\0&0&0&1\\0&0&0&0\\0&0&0&0\\0&0&0&0\\0&0&0&0\end{bmatrix},\begin{bmatrix}0&0&0&0\\0&0&0&0\\0&0&0&0\\1&0&0&0\\0&1&0&0\\0&0&1&0\\0&0&0&1\\0&0&0&0\end{bmatrix},\begin{bmatrix}0&0&1&0\\0&0&0&1\\0&0&0&0\\0&0&0&0\\0&0&0&0\\0&0&0&0\\1&0&0&0\\0&1&0&0\end{bmatrix}.$$

When $d_{PS}=4$, the 2 possible realizations of E corresponding of $m_{PS}=\{0,1\}$ are as follows $$\begin{bmatrix}1&0&0&0\\0&1&0&0\\0&0&1&0\\0&0&0&1\\0&0&0&0\\0&0&0&0\\0&0&0&0\\0&0&0&0\end{bmatrix},\begin{bmatrix}0&0&0&0\\0&0&0&0\\0&0&0&0\\0&0&0&0\\1&0&0&0\\0&1&0&0\\0&0&1&0\\0&0&0&1\end{bmatrix}.$$

To summarize, in one embodiment, $m_{PS}$ parametrizes the location of the first 1 in the first column of E, whereas $d_{PS}$ represents the row shift corresponding to different values of mps.

For 4 antenna ports {3000, 3001, . . . , 3003}, 8 antenna ports {3000, 3001, . . . , 3007}, 12 antenna ports {3000, 3001, . . . , 3011}, 16 antenna ports {3000, 3001, . . . , 3015}, 24 antenna ports {3000, 3001, . . . , 3023}, and 32 antenna ports {3000, 3001, . . . , 3031}, and the UE configured with higher layer parameter codebookType set to 'typeII-PortSelection' i. The number of CSI-RS ports is given by $P_{CSI-RS}\in\{4, 8,12,16,24,32\}$ as configured by higher layer parameter nrofPorts.

ii. The value of L is configured with the higher layer parameter numberOfBeams, where L=2 when $P_{CSI-RS}=4$ and $L\in\{2,3,4\}$ when $P_{CSI-RS}>4$.

iii. The value of d is configured with the higher layer parameter portSelectionSamplingSize, where $d\in\{1,2,3,4\}$ and $$d \le \min\left(\frac{P_{CSI-RS}}{2}, L\right).$$

iv. The value of $N_{PSK}$ is configured with the higher layer parameter phaseAlphabetSize, where $N_{PSK}\in\{4,8\}$.

v. The UE is configured with the higher layer parameter subbandAmplitude set to 'true' or 'false'.

vi. The UE shall not report RI>2.

The UE is also configured with the higher layer parameter typeII-PortSelectionRI-Restriction. The bitmap parameter typeII-PortSelectionRI-Restriction forms the bit sequence $r_1,r_0$ where $r_0$ is the LSB and $r_1$ is the MSB. When $r_i$ is zero, $i\in\{0,1\}$, PMI and RI reporting are not allowed to correspond to any precoder associated with v=i+1 layers.

When v≤2, where v is the associated RI value, each PMI value corresponds to the codebook indices $i_1$ and $i_2$ where $$i_1 = \begin{cases}[\,i_{1,1} \quad i_{1,3,1} \quad i_{1,4,1}\,] & v=1\\ [\,i_{1,1} \quad i_{1,3,1} \quad i_{1,4,1} \quad i_{1,3,2} \quad i_{1,4,2}\,] & v=2\end{cases}$$

$$i_2 = \begin{cases}[i_{2,1,1}] & subbandAmplitude = \text{'false'}, v=1\\ [\,i_{2,1,1} \quad i_{2,1,2}\,] & subbandAmplitude = \text{'false'}, v=2\\ [\,i_{2,1,1} \quad i_{2,2,2}\,] & subbandAmplitude = \text{'true'}, v=1\\ [\,i_{2,1,1} \quad i_{2,2,1} \quad i_{2,1,2} \quad i_{2,2,2}\,] & subbandAmplitude = \text{'true'}, v=2\end{cases}$$

The L antenna ports per polarization are selected by the index $i_{1,1}$ where $$i_{1,1} \in \left\{0, 1, \ldots, \left\lceil \frac{P_{CSI-RS}}{2d} \right\rceil - 1\right\}$$

The strongest coefficient on layer l, l=1, . . . , v is identified by $i_{1,3,l}\in\{0,1, \ldots, 2L-1\}$.

The amplitude coefficient indicators $i_{1,4,l}$ and $i_{2,2,l}$ are $$i_{1,4,l} = \left[k_{l,0}^{(1)}, k_{l,1}^{(1)}, \ldots, k_{l,2L-1}^{(1)}\right]$$

$$i_{2,2,l} = \left[k_{l,0}^{(2)}, k_{l,1}^{(2)}, \ldots, k_{l,2L-1}^{(2)}\right]$$

$$k_{l,i}^{(1)} \in \{0, 1, \ldots, 7\}$$

$$k_{l,i}^{(2)} \in \{0, 1\}$$

for l=1, . . . , v. The mapping from $k_{l,i}^{(1)}$ to the amplitude coefficient $p_{l,i}^{(1)}$ is given in Table 5.2.2.2.3-2 and the mapping from $k_{l,i}^{(2)}$ to the amplitude coefficient $p_{l,i}^{(2)}$ is given in Table 5.2.2.2.3-3. The amplitude coefficients are represented by $$p_l^{(1)} = \left[p_{l,0}^{(1)}, p_{l,1}^{(1)}, \ldots, p_{l,2L-1}^{(1)}\right]$$

$$p_l^{(2)} = \left[p_{l,0}^{(2)}, p_{l,1}^{(2)}, \ldots, p_{l,2L-1}^{(2)}\right]$$

for l=1, . . . , v.

The phase coefficient indicators are $$i_{2,1,l} = [c_{l,0}, c_{l,1}, \ldots, c_{l,2L-1}]$$

for l=1, . . . , v.

The amplitude and phase coefficient indicators are reported as follows:

a. The indicators $$k^{(1)}_{l,i_{1,3,l}} = 7,\ k^{(2)}_{l,i_{1,3,l}} = 1, \text{ and } c_{l,i_{1,3,l}} = 0_{(l=1,\ldots,\upsilon)}.k^{(1)}_{l,i_{1,3,l}},$$

$$k^{(2)}_{l,i_{1,3,l}}, \text{ and } c_{l,i_{1,3,l}}$$

are not reported for l=1, . . . , v.

b. The remaining 2L−1 elements of $i_{1,4,l}$(l=1, . . . , v) are reported, where $$k^{(1)}_{l,i}$$

∈{0,1, . . . , 7}. Let $M_l$ (l=1, . . . , v) be the number of elements of $i_{1,4,l}$ that satisfy $$k^{(1)}_{l,i} > 0.$$

c. The remaining 2L−1 elements of $i_{2,1,l}$ and $i_{2,2,l}$ j(l=1, . . . , v) are reported as follows:

i. When subbandAmplitude is set to 'false',

1.

$$k^{(2)}_{l,i}$$

=1 for l=1, . . . , v, and i=0,1, . . . , 2L−1. $i_{2,2,l}$ is not reported for l=1, . . . , v.

2. For l=1, . . . , v, the $M_l$−1 elements of $i_{2,1,l}$ corresponding to the coefficients that satisfy $$k^{(1)}_{l,i} > 0,$$

i≠$i_{1,3,l}$, as determined by the reported elements of $i_{1,4,l}$, are reported, where $c_{l,i}$∈{0, 1, . . . , $N_{PSK}$−1} and the remaining 2L−$M_l$ elements of $i_{2,1,l}$ are not reported and are set to $c_{l,i}$=0.

ii. When subbandAmplitude is set to 'true',

1. For l=1, . . . , v, the elements of $i_{2,2,l}$ and $i_{2,1,l}$ corresponding to the min($M_l$,$K^{(2)}$)−1 strongest coefficients (excluding the strongest coefficient indicated by $i_{1,3,l}$), as determined by the corresponding reported elements of $i_{1,4,l}$, are reported, where $$k^{(2)}_{l,i} \in \{0, 1\}$$

and $c_{l,i}$∈{0, 1, . . . , $N_{PSK}$−1}. The values of $K^{(2)}$ are given in Table 5.2.2.2.3-4. The remaining 2L−min($M_l$,$K^{(2)}$) elements of $i_{2,2,l}$ are not reported and are set to $$k^{(2)}_{l,i} = 1.$$

The elements of $i_{2,1,l}$ corresponding to the $M_l$−min($M_l$,$K^{(2)}$) weakest non-zero coefficients are reported, where $C_{l,i}$∈{0, 1,2,3}. The remaining 2L−$M_l$ elements of $i_{2,1,l}$ are not reported and are set to $c_{l,i}$=0.

2. When two elements, $$k^{(1)}_{l,x} \text{ and } k^{(1)}_{l,y},$$

of the reported elements of $i_{1,4,l}$ are identical $$\left(k^{(1)}_{l,x} = k^{(1)}_{l,y}\right),$$

then element min(x,y) is prioritized to be included in the set of the min($M_l$,$K^{(2)}$)−1 strongest coefficients for $i_{2,1,l}$ and $i_{2,2,l}$(l=1, . . . , v) reporting.

The codebooks for 1-2 layers are given in Table 7, where the quantity $\varphi_{l,i}$ is given by $$\varphi_{l,i} = \begin{cases} e^{j2\pi c_{l,i}/N_{PSK}} & subbandAmplitude = \text{'false'} \\ e^{j2\pi c_{l,i}/N_{PSK}} & subbandAmplitude = \text{'true'}, \min(M_l, K^{(2)}) \\ & \text{strongest coefficients (including } i_{1,3,l}\text{) with } k^{(1)}_{l,i} > 0 \\ e^{j2\pi c_{l,i}/4} & subbandAmplitude = \text{'true'}, M_l - \\ & \min(M_l, K^{(2)}) \text{ weakest coefficients with } k^{(1)}_{l,i} > 0 \\ 1 & subbandAmplitude = \text{'true'}, 2L - M_l \\ & M_l \text{ coefficients with } k^{(1)}_{l,i} = 0 \end{cases}$$

And $v_m$ is a $P_{CSI-RS}$/2-element column vector containing a value of 1 in element (m mod $P_{CSI-RS}$/2) and zeros elsewhere (where the first element is element 0).

TABLE 7

| Codebook for 1-layer and 2-layer CSI reporting using antenna ports 3000 to 2999 + PCSI-RS | |
|---|---|
| Layers | |
| υ = 1 | $W^{(1)}_{i_{1,1},p_1^{(1)},p_1^{(2)},i_{2,1,1}} = W^1_{i_{1,1},p_1^{(1)},p_1^{(2)},i_{2,1,1}}$ |
| υ = 2 | $W^{(2)}_{i_{1,1},p_1^{(1)},p_1^{(2)},i_{2,1,1},p_2^{(1)},p_2^{(2)},i_{2,1,2}} = \frac{1}{\sqrt{2}}\left[W^1_{i_{1,1},p_1^{(1)},p_1^{(2)},i_{2,1,1}} \quad W^2_{i_{1,1},p_2^{(1)},p_2^{(2)},i_{2,1,2}}\right]$ |

TABLE 7-continued

| Codebook for 1-layer and 2-layer CSI reporting using antenna ports 3000 to 2999 + PCSI-RS |
|---|
| Layers |
| where $W^{l}_{i_{1,1},p_l^{(1)},p_l^{(2)},i_{2,1,l}} = \frac{1}{\sqrt{\sum_{i=0}^{2L-1}\left(p_{l,i}^{(1)}p_{l,i}^{(2)}\right)^2}} \begin{bmatrix} \sum_{i=0}^{L-1} v_{i_{1,1}d+i}\, p_{l,i}^{(1)} p_{l,i}^{(2)} \varphi_{l,i} \\ \sum_{i=0}^{L-1} v_{i_{1,1}d+i}\, p_{l,i+L}^{(1)} p_{l,i+L}^{(2)} \varphi_{l,i+L} \end{bmatrix}, l = 1, 2,$ |
| and the mappings from $i_1$ to $i_{1,1}$, $p_1^{(1)}$, and $p_2^{(1)}$ and from $i_2$ to $i_{2,1,1}$, $i_{2,1,2}$, $p_1^{(2)}$, and $p_2^{(2)}$ are as described above, including the ranges of the constituent indices of $i_1$ and $i_2$. |

3GPP NR Rel-15, the Type-I codebook is the baseline codebook for NR, with a variety of configurations. The most common utility of Rel-15 Type-I codebook is a special case of NR Rel-15 Type-II codebook with L=1 for RI=1,2, wherein a phase coupling value is reported for each sub-band, i.e., $W_2$ is $2\times N_3$, with the first row equal to [1, 1, . . . , 1] and the second row equal to $[e^{j2\pi\varphi_0}, \ldots, e^{j2\pi\varphi_{N_3-1}}]$. Under specific configurations, $\varphi_0=\varphi_1 \ldots =\varphi$, i.e., wideband reporting. For RI>2, different beams are used for each pair of layers. The NR Rel-15 Type-I codebook may be depicted as a low-resolution version of NR Rel-15 Type-II codebook with spatial beam selection per layer-pair and phase combining only.

Regarding 3GPP NR Rel-16 Type-II Codebook, it is assumed that the gNB is equipped with a two-dimensional (2D) antenna array with $N_1$, $N_2$ antenna ports per polarization placed horizontally and vertically and communication occurs over $N_3$ PMI sub-bands. A PMI sub-band consists of a set of resource blocks, each resource block consisting of a set of subcarriers. In such case, $2N_1N_2N_3$ CSI-RS ports are utilized to enable DL channel estimation with high resolution for NR Rel. 16 Type-II codebook. In order to reduce the UL feedback overhead, a Discrete Fourier transform (DFT)-based CSI compression of the spatial domain is applied to L dimensions per polarization, where $L<N_1N_2$ Similarly, additional compression in the frequency domain is applied, where each beam of the frequency-domain precoding vectors is transformed using an inverse DFT matrix to the delay domain, and the magnitude and phase values of a subset of the delay-domain coefficients are selected and fed back to the gNB as part of the CSI report. The $2N_1N_2\times N_3$ codebook per layer takes on the form:

$$W = W_1 \tilde{W}_2 W_f^H$$

where $W_1$ is a $2N_1N_2\times 2L$ block-diagonal matrix $(L<N_1N_2)$ with two identical diagonal blocks, i.e., $$W_1 = \begin{bmatrix} B & 0 \\ 0 & B \end{bmatrix},$$

and B is an $N_1N_2\times L$ matrix with columns drawn from a 2D oversampled DFT matrix, as follows:

$$u_m = \left[\, 1 \quad e^{j\frac{2\pi m}{O_2N_2}} \quad \ldots \quad e^{j\frac{2\pi m(N_2-1)}{O_2N_2}} \,\right],$$

-continued $$v_{l,m} = \left[\, u_m \quad e^{j\frac{2\pi l}{O_1N_1}} u_m \quad \ldots \quad e^{j\frac{2\pi l(N_1-1)}{O_1N_1}} u_m \,\right]^T,$$

$$B = [\, v_{l_0,m_0} \quad v_{l_1,m_1} \quad \ldots \quad v_{l_{L-1},m_{L-1}} \,],$$

$$l_i = O_1 n_1^{(i)} + q_1,\ 0 \le n_1^{(i)} < N_1,\ 0 \le q_1 < O_1 - 1,$$

$$m_i = O_2 n_2^{(i)} + q_2,\ 0 \le n_2^{(i)} < N_2,\ 0 \le q_2 < O_2 - 1$$

where the superscript $^T$ denotes a matrix transposition operation. Note that O1, O2 oversampling factors are assumed for the 2D DFT matrix from which matrix B is drawn. Note that $W_1$ is common across all layers. $W_f$ is an $N_3\times M$ matrix (where $M<N_3$) with columns selected from a critically-sampled size-$N_3$ DFT matrix, as follows:

$$W_f = [\, f_{k_0} \quad f_{k_1} \quad \ldots \quad f_{k_{M_f-1}} \,],\ 0 \le k_i < N_3 - 1$$

$$f_k = \left[\, 1 \quad e^{-j\frac{2\pi k}{N_3}} \quad \ldots \quad e^{-j\frac{2\pi k(N_3-1)}{N_3}} \,\right]^T$$

Only the indices of the L selected columns of B are reported, along with the oversampling index taking on O1O2 values. Similarly, for $W_f$, only the indices of the M selected columns out of the predefined size-$N_3$DFT matrix are reported. In the sequel the indices of the M dimensions are referred as the selected Frequency Domain ("FD") basis indices. Hence, L, M represent the equivalent spatial and frequency dimensions after compression, respectively. Finally, the $2L\times M$ matrix $\tilde{W}_2$ represents the linear combination coefficients ("LCCs") of the spatial and frequency DFT-basis vectors. Both $\tilde{W}_2$, $W_f$ are selected independent for different layers. Magnitude and phase values of an approximately β fraction of the 2LM available coefficients are reported to the gNB (β<1) as part of the CSI report. Note that coefficients with zero magnitude are indicated via a per-layer bitmap. Since all coefficients reported within a layer are normalized with respect to the coefficient with the largest magnitude (strongest coefficient), the relative value of that coefficient is set to unity, and no magnitude or phase information is explicitly reported for this coefficient. Only an indication of the index of the strongest coefficient per layer is reported. Hence, for a single-layer transmission, magnitude, and phase values of a maximum of ⌈2βLM⌉−1 coefficients (along with the indices of selected L, M DFT vectors) are reported per layer, leading to significant reduction in CSI report size, compared with reporting $2N_1N_2\times N_3-1$ coefficients' information.

For 4 antenna ports {3000, 3001, . . . , 3003}, 8 antenna ports {3000, 3001, . . . , 30071}, 12 antenna ports {3000, 3001, . . . , 3011}, 16 antenna ports {3000, 3001, . . . , 3015}, 24 antenna ports {3000, 3001, . . . , 3023}, and 32 antenna ports {3000, 3001, . . . , 3031}, and UE configured with higher layer parameter codebookType set to 'typeII-r16' a. The values of $N_1$ and $N_2$ are configured with the higher layer parameter n1-n2-codebookSubsetRestriction-r16. The supported configurations of ($N_1$, $N_2$) for a given number of CSI-RS ports and the corresponding values of ($O_1$,$O_2$) are given in Table 5.2.2.2.1-2. The number of CSI-RS ports, $P_{CSI\text{-}RS}$, is $2N_1N_2$.

b. The values of L, β and $p_v$ are determined by the higher layer parameter paramCombination-r16, where the mapping is given in Table 5.2.2.2.5-1.

i. The UE is not expected to be configured with paramCombination-r16 equal to 1. 3, 4, 5, 6, 7, or 8 when $P_{CSI\text{-}RS}$=4, 2. 7 or 8 when $P_{CSI\text{-}RS}$<32

3. 7 or 8 when higher layer parameter typeII-RI-Restriction-r16 is configured with $r_i$=1 for any i>1.

4. 7 or 8 when R=2.

c. The parameter R is configured with the higher-layer parameter numberOfPMISubbandsPerCQISubband-r16. This parameter controls the total number of precoding matrices $N_3$ indicated by the PMI as a function of the number of configured sub-bands in csi-ReportingBand, the sub-band size configured by the higher-level parameter subbandSize and of the total number of PRBs in the bandwidth part according to Table 5.2.1.4-2, as follows:

i. When R=1:

1. One precoding matrix is indicated by the PMI for each sub-band in csi-ReportingBand.

ii. When R=2:

1. For each sub-band in csi-ReportingBand that is not the first or last sub-band of a BWP, two precoding matrices are indicated by the PMI: the first precoding matrix corresponds to the first $$N_{PRB}^{SB}/2$$

PRBs of the subband and the second precoding matrix corresponds to the last $$N_{PRB}^{SB}/2$$

PRBs of the subband.

2. For each sub-band in csi-ReportingBand that is the first or last sub-band of a BWP a. If $$\left(N_{BWP,i}^{start}\bmod N_{PRB}^{SB}\right)\geq\frac{N_{PRB}^{SB}}{2},$$

one precoding matrix is indicated by the PMI corresponding to the first sub-band. If $$\left(N_{BWP,i}^{start}\bmod N_{PRB}^{SB}\right)<\frac{N_{PRB}^{SB}}{2},$$

two precoding matrices are indicated by the PMI corresponding to the first sub-band: the first precoding matrix corresponds to the first $$\frac{N_{PRB}^{SB}}{2}-\left(N_{BWP,i}^{start}\bmod N_{PRB}^{SB}\right)$$

PRBs of the first subband and the second precoding matrix corresponds to the last $$\frac{N_{PRB}^{SB}}{2}$$

PRBs of the first subband.

b. If $$1+\left(N_{BWP,i}^{start}+N_{BWP,i}^{size}-1\right)\bmod N_{PRB}^{SB}\leq\frac{N_{PRB}^{SB}}{2},$$

one precoding matrix is indicated by the PMI corresponding to the last subband. If $$1+\left(N_{BWP,i}^{start}+N_{BWP,i}^{size}-1\right)\bmod N_{PRB}^{SB}>\frac{N_{PRB}^{SB}}{2},$$

two precoding matrices are indicated by the PMI corresponding to the last subband: the first precoding matrix corresponds to the first $$\frac{N_{PRB}^{SB}}{2}$$

PRBs of the last subband and the second precoding matrix corresponds to the last $$1+\left(N_{BWP,i}^{start}+N_{BWP,i}^{size}-1\right)\bmod N_{PRB}^{SB}-\frac{N_{PRB}^{SB}}{2}$$

PRBs of the last subband.

TABLE 8

Codebook parameter configurations for L, β and $p_v$

| paramCombination- | | $p_v$ | | |
|---|---|---|---|---|
| r16 | L | v ∈ {1, 2} | v ∈ {3, 4} | β |
| 1 | 2 | ¼ | ⅛ | ¼ |
| 2 | 2 | ¼ | ⅛ | ½ |
| 3 | 4 | ¼ | ⅛ | ¼ |
| 4 | 4 | ¼ | ⅛ | ½ |
| 5 | 4 | ½ | ¼ | ¾ |
| 6 | 4 | ½ | ¼ | ½ |
| 7 | 6 | ½ | — | ½ |
| 8 | 6 | ¼ | — | ¾ |

d. The UE shall report the RI value v according to the configured higher layer parameter typeII-RI-Restriction-r16. The UE shall not report v>4.

The PMI value corresponds to the codebook indices of $i_1$ and $i_2$ where $$i_1 = \begin{cases} [i_{1,1}\ i_{1,2}\ i_{1,5}\ i_{1,6,1}\ i_{1,7,1}\ i_{1,8,1}] & v=1 \\ [i_{1,1}\ i_{1,2}\ i_{1,5}\ i_{1,6,1}\ i_{1,7,1}\ i_{1,8,1}\ i_{1,6,2}\ i_{1,7,2}\ i_{1,8,2}] & v=2 \\ [i_{1,1}\ i_{1,2}\ i_{1,5}\ i_{1,6,1}\ i_{1,7,1}\ i_{1,8,1}\ i_{1,6,2}\ i_{1,7,2}\ i_{1,8,2}\ i_{1,6,3}\ i_{1,7,3}\ i_{1,8,3}] & v=3 \\ [i_{1,1}\ i_{1,2}\ i_{1,5}\ i_{1,6,1}\ i_{1,7,1}\ i_{1,8,1}\ i_{1,6,2}\ i_{1,7,2}\ i_{1,8,2}\ i_{1,6,3}\ i_{1,7,3}\ i_{1,8,2}\ i_{1,6,4}\ i_{1,7,4}\ i_{1,8,4}] & v=4 \end{cases}$$

$$i_2 = \begin{cases} [i_{2,3,1}\ i_{2,4,1}\ i_{2,5,1}] & v=1 \\ [i_{2,3,1}\ i_{2,4,1}\ i_{2,5,1}\ i_{2,3,2}\ i_{2,4,2}\ i_{2,5,2}] & v=2 \\ [i_{2,3,1}\ i_{2,4,1}\ i_{2,5,1}\ i_{2,3,2}\ i_{2,4,2}\ i_{2,5,2}\ i_{2,3,3}\ i_{2,4,3}\ i_{2,5,3}] & v=3 \\ [i_{2,3,1}\ i_{2,4,1}\ i_{2,5,1}\ i_{2,3,2}\ i_{2,4,2}\ i_{2,5,2}\ i_{2,3,3}\ i_{2,4,3}\ i_{2,5,3}\ i_{2,3,4}\ i_{2,4,4}\ i_{2,5,4}] & v=4 \end{cases}$$

The precoding matrices indicated by the PMI are determined from L+$M_v$ vectors.

L vectors, $$v_{m_1^{(i)},m_2^{(i)}},\ i = 0, 1, \ldots, L-1,$$

are indentified by the indices $q_1$, $q_2$, $n_1$, $n_2$, indicated by $i_{1,1}$, $i_{1,2}$, where the values of C(x,y) are given in Table 11.

$$M_v = \left\lceil p_v \frac{N_3}{R} \right\rceil$$

vectors, $$\left[y_{0,l}^{(f)}, y_{1,l}^{(f)}, \ldots, y_{N_3-1,l}^{(f)}\right]^T,$$

f=0, 1, . . . , M−1, are identified by $M_{initial}$ (for $N_3$>19) and $n_{3,l}$(l=1, . . . , v) where $$M_{initial} \in \{-2M_v+1, -2M_v+2, \ldots, 0\}$$
$$n_{3,l} = \left[n_{3,l}^{(0)}, \ldots, n_{3,l}^{(M_v-1)}\right]$$
$$n_{3,l}^{(f)} \in \{0, 1, \ldots, N_3-1\}$$

which are indicated by means of the indices $i_{1,5}$ (for $N_3$>19) and $i_{1,6,l}$ (for $M_v > 1$ and $l = 1, \ldots, v$), where $$i_{1,5} \in \{0, 1, \ldots, 2M_v - 1\}$$

$$i_{1,6,l} \in \begin{cases} \left\{0, 1, \ldots, \binom{N_3-1}{M_v-1} - 1\right\} & N_3 \le 19 \\ \left\{0, 1, \ldots, \binom{2M_v-1}{M_v-1} - 1\right\} & N_3 > 19 \end{cases}$$

The amplitude coefficient indicators $i_{2,3,l}$ and $i_{2,4,l}$ are $$i_{2,3,l} = \left[k_{l,0}^{(1)}\ k_{l,1}^{(1)}\right]$$
$$i_{2,4,l} = \left[k_{l,0}^{(2)} \ldots k_{l,M_v-1}^{(2)}\right]$$
$$k_{l,f}^{(2)} = \left[k_{l,0,f}^{(2)} \ldots k_{l,2L-1,f}^{(2)}\right]$$
$$k_{l,p}^{(1)} \in \{1, \ldots, 15\}$$
$$k_{l,i,f}^{(2)} \in \{0, \ldots, 7\}$$

for l=1, . . . , v.

The phase coefficient indicator $i_{2,5,l}$ is $$i_{2,5,l} = \left[c_{l,0} \ldots c_{l,M_v-1}\right]$$
$$c_{l,f} = \left[c_{l,0,f} \ldots c_{l,2L-1,f}\right]$$
$$c_{l,i,f} \in \{0, \ldots, 15\}$$

for l=1, . . . , v.

Let $K_0$=[β2L$M_1$]. The bitmap whose nonzero bits identify which coefficients in $i_{2,4,l}$ and $i_{2,5,l}$ are reported, is indicated by $i_{1,7,l}$ $$i_{1,7,l} = \left[k_{l,0}^{(3)} \ldots k_{l,M_v-1}^{(3)}\right]$$
$$k_{l,f}^{(3)} = \left[k_{l,0,f}^{(3)} \ldots k_{l,2L-1,f}^{(3)}\right]$$
$$k_{l,i,f}^{(3)} \in \{0, 1\}$$

for l=1, . . . , v, such that $$K_l^{NZ} = \sum_{i=0}^{2L-1} \sum_{f=0}^{M_v-1} k_{l,i,f}^{(3)} \le K_0$$

is the number of nonzero coefficients for layer l=1, . . . , v and $$K^{NZ} = \sum_{l=1}^{v} K_l^{NZ} \le 2K_0$$

is the total number of nonzero coefficients.

The indices of $i_{2,4,l}$, $i_{2,5,l}$ and $i_{1,7,l}$ are associated to the $M_v$ codebook indices in $n_{3,l}$.

The mapping from $$k_{l,p}^{(1)}$$

to the amplitude coefficient $$p_{l,p}^{(1)}$$

is given in Table 5.2.2.2.5-2 and the mapping from $$k_{l,i,f}^{(2)}$$

to the amplitude coefficient $$p_{l,i,f}^{(2)}$$

is given in Table 5.2.2.2.5-3. The amplitude coefficients are represented by $$p_l^{(1)} = \left[ p_{l,0}^{(1)} \;\; p_{l,1}^{(1)} \right]$$

$$p_l^{(2)} = \left[ p_{l,0}^{(2)} \cdots p_{l,M_v-1}^{(2)} \right]$$

$$p_{l,f}^{(2)} = \left[ p_{l,0,f}^{(2)} \cdots p_{l,2L-1,f}^{(2)} \right]$$

for l=1, . . . , v.

Let $$f_l^* \in \{0, 1, \ldots, M_v - 1\}$$

be the index of $i_{2,4,l}$ and $$i_l^* \in \{0, 1, \ldots, 2L - 1\}$$

be the index of $$k_{l,f_l^*}^{(2)}$$

which identify the strongest coefficient of layer l, i.e., the element $$k_{l,i_l^*,f_l^*}^{(2)}$$

of $i_{2,4,l}$, for l=1, . . . , v. The codebook indices of $n_{3,l}$ are remapped with respect to $$n_{3,l}^{(f_l^*)}$$

as $$n_{3,l}^{(f)} = \left( n_{3,l}^{(f)} - n_{3,l}^{(f_l^*)} \right) \bmod N_3,$$

such that $$n_{3,l}^{(f_l^*)} = 0,$$

after remapping. The index f is remapped with respect to $$f_l^* \text{ as } f = (f - f_l^*)$$

mod $M_v$, such that the index of the strongest coefficient is $$f_l^* = 0 \; (l = 1, \ldots, v),$$

after remapping. The indices of $i_{2,4,l}$, $i_{2,5,l}$ and $i_{1,7,l}$ indicate amplitude coefficients, phase coefficients and bitmap after remapping.

The strongest coefficient of layer l is identified by $i_{2,8,l} \in \{0,1, \ldots, 2L-1\}$, which is obtained as follows $$i_{1,8,l} = \begin{cases} \sum_{i=0}^{i_1^*} k_{1,i,0}^{(3)} - 1 & v = 1 \\ i_l^* & 1 < v \leq 4 \end{cases}$$

for l=1, . . . , v.

TABLE 9

| Mapping of elements of $i_{2,3,l}$: $k_{l,p}^{(1)}$ to $p_{l,p}^{(1)}$ | |
|---|---|
| $k_{l,p}^{(1)}$ | $p_{l,p}^{(1)}$ |
| 0 | Reserved |
| 1 | $\frac{1}{\sqrt{128}}$ |
| 2 | $\left(\frac{1}{8192}\right)^{1/4}$ |
| 3 | $\frac{1}{8}$ |
| 4 | $\left(\frac{1}{2048}\right)^{1/4}$ |
| 5 | $\frac{1}{2\sqrt{8}}$ |
| 6 | $\left(\frac{1}{512}\right)^{1/4}$ |
| 7 | $\frac{1}{4}$ |
| 8 | $\left(\frac{1}{128}\right)^{1/4}$ |
| 9 | $\frac{1}{\sqrt{8}}$ |
| 10 | $\left(\frac{1}{32}\right)^{1/4}$ |
| 11 | $\frac{1}{2}$ |
| 12 | $\left(\frac{1}{8}\right)^{1/4}$ |
| 13 | $\frac{1}{\sqrt{2}}$ |
| 14 | $\left(\frac{1}{2}\right)^{1/4}$ |
| 15 | 1 |

The amplitude and phase coefficient indicators are reported as follows:

a.

$$k^{(1)}_{l,\left\lfloor \frac{i_l^*}{L} \right\rfloor} = 15,\ k^{(2)}_{l,i_l^*,0} = 7,\ k^{(3)}_{l,i_l^*,0} = 1 \text{ and } c_{l,i_l^*,0} = 0 (l = 1, \ldots, v).$$

S The indicators $$k^{(1)}_{l,\left\lfloor \frac{i_l^*}{L} \right\rfloor},\ k^{(2)}_{l,i_l^*,0} \text{ and } c_{l,i_l^*,0} \text{ are not reported for } l = 1, \ldots, v.$$

b. The indicator $$k^{(1)}_{l,\left(\left\lfloor \frac{i_l^*}{L} \right\rfloor + 1\right) mod 2}$$

is reported for l=1, . . . , v.

c. The $K^{NZ}$−v indicators $$k^{(2)}_{l,i,f}$$

for which $$k^{(3)}_{l,i,f} = 1,\ i \neq i_l^*,\ f \neq 0$$

are reported.

d. The $K^{NZ}$−v indicators $c_{l,i,f}$ for which $$k^{(3)}_{l,i,f} = 1,\ i \neq i_l^*,\ f \neq 0$$

are reported.

e. The remaining $2L \cdot M_v \cdot v - K^{NZ}$ indicators $$k^{(2)}_{l,i,f}$$

are not reported.

f. The remaining $2L \cdot M_v \cdot v - K^{NZ}$ indicators $c_{l,i,f}$ are not reported.

TABLE 10

| Mapping of elements of $i_{2,4,l}$: $k_{l,i,f}^{(2)}$ to $p_{l,i,f}^{(2)}$ | |
|---|---|
| $k_{l,i,f}^{(2)}$ | $p_{l,i,f}^{(2)}$ |
| 0 | $\frac{1}{8\sqrt{2}}$ |
| 1 | $\frac{1}{8}$ |
| 2 | $\frac{1}{4\sqrt{2}}$ |
| 3 | $\frac{1}{4}$ |

TABLE 10-continued

| Mapping of elements of $i_{2,4,l}$: $k_{l,i,f}^{(2)}$ to $p_{l,i,f}^{(2)}$ | |
|---|---|
| $k_{l,i,f}^{(2)}$ | $p_{l,i,f}^{(2)}$ |
| 4 | $\frac{1}{2\sqrt{2}}$ |
| 5 | $\frac{1}{2}$ |
| 6 | $\frac{1}{\sqrt{2}}$ |
| 7 | 1 |

The elements of $n_1$ and $n_2$ are found from $i_{1,2}$ using the algorithm described above, where the values of C(x,y) are given in Table 11.

For $N_3>19$, $M_{initial}$ is identified by $i_{1,5}$.

For all values of $N_3$, $$n_{3,l}^{(0)} = 0$$

for l=1, . . . , v. If $M_v>1$, the nonzero elements of $n_{3,\ l}$, identified by $$n_{3,l}^{(f)}, \ldots, n_{3,l}^{(M_v-1)},$$

are found from $i_{1,6,l}$ (l=1, . . . , v), for $N_3 \leq 19$, and from $i_{1,6,l}$ initial, for $N_3>19$, using C(x,y) as defined in Table 11 and the algorithm:

$s_0 = 0$
for $f = 1, \ldots, M_\upsilon - 1$
  Find the largest $x^* \in \{M_\upsilon - 1 - f, \ldots, N_3 - 1 - f\}$ in Table 5.2.2.2.5-4 such that
  $i_{1,6,l} - s_{f-1} \geq C(x^*, M_\upsilon - f)$
  $e_f = C(x^*, M_\upsilon) - f)$
  $s_f = s_{f-1} + e_f$
  if $N_3 \leq 19$ $n_{3,l}^{(f)} = N_3 - 1 - x^*$ else $n_l^{(f)} = 2M_\upsilon - 1 - x^*$ if $n_l^{(f)} \leq M_{initial} + 2M_\upsilon - 1$ $n_{3,l}^{(f)} = n_l^{(f)}$ else $n_{3,l}^{(f)} = n_l^{(f)} + (N_3 - 2M_\upsilon)$ end if
  end if

TABLE 11

| Combinatorial coefficients C(x, y) | | | | | | | | | |
|---|---|---|---|---|---|---|---|---|---|
| | y | | | | | | | | |
| x | 1 | 2 | 3 | 4 | 5 | 6 | 7 | 8 | 9 |
| 0 | 0 | 0 | 0 | 0 | 0 | 0 | 0 | 0 | 0 |
| 1 | 1 | 0 | 0 | 0 | 0 | 0 | 0 | 0 | 0 |
| 2 | 2 | 1 | 0 | 0 | 0 | 0 | 0 | 0 | 0 |
| 3 | 3 | 3 | 1 | 0 | 0 | 0 | 0 | 0 | 0 |
| 4 | 4 | 6 | 4 | 1 | 0 | 0 | 0 | 0 | 0 |
| 5 | 5 | 10 | 10 | 5 | 1 | 0 | 0 | 0 | 0 |
| 6 | 6 | 15 | 20 | 15 | 6 | 1 | 0 | 0 | 0 |
| 7 | 7 | 21 | 35 | 35 | 21 | 7 | 1 | 0 | 0 |
| 8 | 8 | 28 | 56 | 70 | 56 | 28 | 8 | 1 | 0 |
| 9 | 9 | 36 | 84 | 126 | 126 | 84 | 36 | 9 | 1 |
| 10 | 10 | 45 | 120 | 210 | 252 | 210 | 120 | 45 | 10 |
| 11 | 11 | 55 | 165 | 330 | 462 | 462 | 330 | 165 | 55 |
| 12 | 12 | 66 | 220 | 495 | 792 | 924 | 792 | 495 | 220 |
| 13 | 13 | 78 | 286 | 715 | 1287 | 1716 | 1716 | 1287 | 715 |
| 14 | 14 | 91 | 364 | 1001 | 2002 | 3003 | 3432 | 3003 | 2002 |
| 15 | 15 | 105 | 455 | 1365 | 3003 | 5005 | 6435 | 6435 | 5005 |
| 16 | 16 | 120 | 560 | 1820 | 4368 | 8008 | 11440 | 12870 | 11440 |
| 17 | 17 | 136 | 680 | 2380 | 6188 | 12376 | 19448 | 24310 | 24310 |
| 18 | 18 | 153 | 816 | 3060 | 8568 | 18564 | 31824 | 43758 | 48620 |

When $n_{3,l}$ and $M_{initial}$ are known, $i_{1,5}$ and $i_{1,6,l}$(l=1, . . . , v) are found as follows:

a. If $N_3 \le 19$, $i^{1,5}=0$ and is not reported. If $M_v=1$, $i_{1,6,l}=0$, for l=1, . . . , v, and is not reported. If $$M_v > 1,\ i_{1,6,l} = \sum_{f=1}^{M_v-1} C\left(N_3 - 1 - n_{3,l}^{(f)},\ M_v - f\right),$$

where C(x,y) is given in Table 5.2.2.2.5-4 and where the indices f=1, . . . , $M_v-1$ are assigned such that $$n_{3,l}^{(f)}$$

increases as f increases.

b. If $N_3>19$, $M_{initial}$ is indicated by $ii_{1,5}$, which is reported and given by $$i_{1,5} = \begin{cases} M_{initial} & M_{initial} = 0 \\ M_{initial} + 2M_v & M_{initial} < 0 \end{cases}$$

Only the nonzero indices $$n_{3,l}^{(f)} \in IntS,$$

where IntS={($M_{initial}$+i)mod $N_3$,i=0,1, . . . , $2M_v-1$}, are reported, where the indices f=1, . . . , $M_v-1$ are assigned such that $$n_{3,l}^{(f)}$$

increases as f increases. Let $$n_l^{(f)} = \begin{cases} n_{3,l}^{(f)} & n_{3,l}^{(f)} \le M_{initial} + 2M_v - 1 \\ n_{3,l}^{(f)} - (N_3 - 2M_v) & n_{3,l}^{(f)} > M_{initial} + N_3 - 1 \end{cases},$$

then $$i_{1,6,l} = \sum_{f=1}^{M_v-1} C\left(2M_v - 1 - n_l^{(f)},\ M_v - f\right),$$

where C(x,y) is given in Table 11.

The codebooks for 1-4 layers are given in Table 12, where $$m_1^{(i)},\ m_2^{(i)},\ \text{for } i = 0, 1, \ldots, L-1,\ v_{m_1^{(i)},m_2^{(i)}}$$

are obtained and the quantities $\varphi_{l,i,f}$ and $y_{t,l}$ are given by $$\varphi_{l,i,f} = e^{j\frac{2\pi c_{l,i,f}}{16}}$$

$$y_{t,l} = \left[\, y_{t,l}^{(0)} \;\; y_{t,l}^{(1)} \;\; \ldots \;\; y_{t,l}^{(M_v-1)} \,\right]$$

where t={0, 1, . . . , $N_3-1$}, is the index associated with the precoding matrix, l={1, . . . , v}, and with $$y_{t,l}^{(f)} = e^{j\frac{2\pi t n_{3,l}^{(f)}}{N_3}}$$

for f=0, 1, . . . , $M_v-1$.

TABLE 12

Codebook for 1-layer, 2-layer, 3-layer and 4-layer CSI reporting using antenna ports 3000 to 2999 + PCSI-RS

| Layers | |
|---|---|
| υ = 1 | $W^{(1)}_{q_1,q_2,n_1,n_2,n_{3,1},p_1^{(1)},p_1^{(2)},i_{2,5,1},t} = W^{1}_{q_1,q_2,n_1,n_2,n_{3,1},p_1^{(1)},p_1^{(2)},i_{2,5,1},t}$ |
| υ = 2 | $W^{(2)}_{q_1,q_2,n_1,n_2,n_{3,1},p_1^{(1)},p_1^{(2)},i_{2,5,1},n_{3,2},p_2^{(1)},p_2^{(2)},i_{2,5,2},t} = \frac{1}{\sqrt{2}}\begin{bmatrix} W^{1}_{q_1,q_2,n_1,n_2,n_{3,1},p_1^{(1)},p_1^{(2)},i_{2,5,1},t} & W^{2}_{q_1,q_2,n_1,n_2,n_{3,2},p_2^{(1)},p_2^{(2)},i_{2,5,2},t} \end{bmatrix}$ |
| υ = 3 | $W^{(3)}_{q_1,q_2,n_1,n_2,n_{3,1},p_1^{(1)},p_1^{(2)},i_{2,5,1},n_{3,2},p_2^{(1)},p_2^{(2)},i_{2,5,2},n_{3,3},p_3^{(1)},p_3^{(2)},i_{2,5,3},t} = \frac{1}{\sqrt{3}}\begin{bmatrix} W^{1}_{q_1,q_2,n_1,n_2,n_{3,1},p_1^{(1)},p_1^{(2)},i_{2,5,1},t} & W^{2}_{q_1,q_2,n_1,n_2,n_{3,2},p_2^{(1)},p_2^{(2)},i_{2,5,2},t} & W^{3}_{q_1,q_2,n_1,n_2,n_{3,3},p_3^{(1)},p_3^{(2)},i_{2,5,3},t} \end{bmatrix}$ |
| υ = 4 | $W^{(4)}_{q_1,q_2,n_1,n_2,n_{3,1},p_1^{(1)},p_1^{(2)},i_{2,5,1},n_{3,2},p_2^{(1)},p_2^{(2)},i_{2,5,2},n_{3,3},p_3^{(1)},p_3^{(2)},i_{2,5,3},n_{3,4},p_4^{(1)},p_4^{(2)},i_{2,5,4},t} = \frac{1}{2}\begin{bmatrix} W^{1}_{q_1,q_2,n_1,n_2,n_{3,1},p_1^{(1)},p_1^{(2)},i_{2,5,1},t} & W^{2}_{q_1,q_2,n_1,n_2,n_{3,2},p_2^{(1)},p_2^{(2)},i_{2,5,2},t} \\ W^{3}_{q_1,q_2,n_1,n_2,n_{3,3},p_3^{(1)},p_3^{(2)},i_{2,5,3},t} & W^{4}_{q_1,q_2,n_1,n_2,n_{3,4},p_4^{(1)},p_4^{(2)},i_{2,5,4},t} \end{bmatrix}$ |

Where $W^{l}_{q_1,q_2,n_1,n_2,n_3,p_l^{(1)},p_l^{(2)},i_{2,5,l},t} = \frac{1}{\sqrt{N_1 N_2 \gamma_{t,l}}}\begin{bmatrix} \sum_{i=0}^{L-1} v_{m_1^{(i)},m_2^{(i)}} p_{l,0}^{(1)} \sum_{f=0}^{M_\upsilon-1} y_{t,l}^{(f)} p_{l,i,f}^{(2)} \varphi_{l,i,f} \\ \sum_{i=0}^{L-1} v_{m_1^{(i)},m_2^{(i)}} p_{l,1}^{(1)} \sum_{f=0}^{M_\upsilon-1} y_{t,l}^{(f)} p_{l,i+L,f}^{(2)} \varphi_{l,i+L,f} \end{bmatrix}$, $l = 1, 2, 3, 4,$ and the mappings from $i_1$ to $q_1$, $q_2$, $n_1$, $n_2$, $n_{3,1}$, $n_{3,2}$, $n_{3,3}$, $n_{3,4}$, and from $i_2$ to $i_{2,5,1}$, $i_{2,5,2}$, $i_{2,5,3}$, $i_{2,5,4}$, $p_1^{(1)}$, $p_2^{(1)}$, $p_3^{(1)}$ and $p_4^{(1)}$, $p_1^{(2)}$, $p_2^{(2)}$, $p_3^{(2)}$ and $p_4^{(2)}$ are as described above, including including the ranges of the constituent indices of $i_1$ and $i_2$.

For coefficients with $$k_{l,i,f}^{(3)} = 0,$$

amplitude and phase are set to zero, i.e., $$p_{l,i,f}^{(2)} = 0 \text{ and } \varphi_{l,i,f} = 0.$$

The bitmap parameter typeII-RI-Restriction-r16 forms the bit sequence $r_3$, $r_2$, $r_1$, $r_0$, where $r_0$, is the LSB and $r_3$ is the MSB. When $r_i$ is zero, $i \in \{0, 1, \ldots, 3\}$, PMI and RI reporting are not allowed to correspond to any precoder associated with v=i+1 layers.

The bitmap parameter n1-n2-codebookSubsetRestriction-r16 forms the bit sequence $B=B_1B_2$ and configures the vector group indices $g^{(k)}$ as in clause 5.2.2.2.3. Bits $$b_2^{(k,2(N_1x_2+x_1)+1)} b_2^{(k,2(N_1x_2+x_1))}$$

indicate the maximum allowed average amplitude, $\gamma_{i+pL}$ (p=0,1), with $i \in \{0, 1, \ldots, L-1\}$, of the coefficients associated with the vector in group $g^{(k)}$ indexed by $x_1$, $x_2$, where the maximum amplitudes are given in Table 5.2.2.2.5-6 and the average coefficient amplitude is restricted as follows $$\sqrt{\frac{1}{\sum_{f=0}^{M_v-1} k_{l,i+pL,f}^{(3)}} \sum_{f=0}^{M_v-1} k_{l,i+pL,f}^{(3)} \left(p_{l,p}^{(1)} p_{l,i+pL,f}^{(2)}\right)^2} \le \gamma_{i+pL}$$

for l=1, . . . , v, and p=0,1. A UE that does not report the parameter amplitudeSubsetRestriction='supported' in its capability signaling is not expected to be configured with $$b_2^{(k,2(N_1x_2+x_1)+1)} b_2^{(k,2(N_1x_2+x_1))} = 01 \text{ or } 10.$$

TABLE 13

| Maximum allowed average coefficient amplitudes for restricted vectors | |
|---|---|
| Bit $b_2^{(k,\ 2(N_1x_2+x_2)+1)}$ $b_2^{(k,\ 2(N_1x_2+x_1))}$ | Maximum Average Coefficient Amplitude $\gamma_{i+pL}$ |
| 00 | 0 |
| 01 | $\sqrt{1/4}$ |
| 10 | $\sqrt{1/2}$ |
| 11 | 1 |

Regarding 3GPP NR Rel-16, for Type-II Port Selection codebook, only K (where $K<2N_1N_2$) beamformed CSI-RS ports are utilized in DL transmission, in order to reduce complexity. The $K\times N_3$ codebook matrix per layer takes on the form:

$$W = W_1^{PS}\tilde{W}_2W_f^H$$

Here, $\tilde{W}_2$ and $W_3$ follow the same structure as the conventional NR Rel-16 Type-II Codebook, where both are layer specific. The matrix $$W_1^{PS}$$

is a $K\times 2L$ block-diagonal matrix with the same structure as that in the NR Rel-15 Type-II Port Selection Codebook.

For 4 antenna ports {3000, 3001, . . . , 3003}, 8 antenna ports {3000, 3001, . . . , 3007}, 12 antenna ports {3000, 3001, . . . , 3011}, 16 antenna ports {3000, 3001, . . . , 3015}, 24 antenna ports {3000, 3001, . . . , 3023}, and 32 antenna ports {3000, 3001, . . . , 3031}, and the UE configured with higher layer parameter codebookType set to 'typeII-PortSelection-r16' a. The number of CSI-RS ports is configured.

b. The value of d is configured with the higher layer parameter portSelectionSamplingSize-r16, where $d\in\{1,2,3,4\}$ and $d\leq L$.

c. The values L, β and $p_v$ are configured where the supported configurations are given in Table 14.

TABLE 14

| Codebook parameter configurations for L, β and $p_v$ | | | | |
|---|---|---|---|---|
| paramCombination- | | $p_v$ | | |
| r16 | L | $v \in \{1, 2\}$ | $v \in \{3, 4\}$ | β |
| 1 | 2 | 1/4 | 1/8 | 1/4 |
| 2 | 2 | 1/4 | 1/8 | 1/2 |
| 3 | 4 | 1/4 | 1/8 | 1/4 |
| 4 | 4 | 1/4 | 1/8 | 1/2 |
| 5 | 4 | 1/4 | 1/4 | 3/4 |
| 6 | 4 | 1/2 | 1/4 | 1/2 |

d. The UE shall report the RI value v according to the configured higher layer parameter typeII-PortSelectionRI-Restriction-r16. The UE shall not report v>4.

e. The values of R is configured as in Clause 5.2.2.2.5.

The UE is also configured with the higher layer bitmap parameter typeII-PortSelectionRI-Restriction-r16, which forms the bit sequence $r_3, r_2, r_1, r_0$, where $r_0$ is the LSB and $r_3$ is the MSB. When $r_i$ is zero, $i\in\{0,1, \ldots, 3\}$, PMI and RI reporting are not allowed to correspond to any precoder associated with v=i+1 layers.

The PMI value corresponds to the codebook indices $i_1$ and $i_2$ where $$i_1 = \begin{cases} [i_{1,1}\ \ i_{1,5}\ \ i_{1,6,1}\ \ i_{1,7,1}\ \ i_{1,8,1}] & v=1 \\ [i_{1,1}\ \ i_{1,5}\ \ i_{1,6,1}\ \ i_{1,7,1}\ \ i_{1,8,1}\ \ i_{1,6,2}\ \ i_{1,7,2}\ \ i_{1,8,2}] & v=2 \\ [i_{1,1}\ \ i_{1,5}\ \ i_{1,6,1}\ \ i_{1,7,1}\ \ i_{1,8,1}\ \ i_{1,6,2}\ \ i_{1,7,2}\ \ i_{1,8,2}\ \ i_{1,6,3}\ \ i_{1,7,3}\ \ i_{1,8,3}] & v=3 \\ [i_{1,1}\ \ i_{1,5}\ \ i_{1,6,1}\ \ i_{1,7,1}\ \ i_{1,8,1}\ \ i_{1,6,2}\ \ i_{1,7,2}\ \ i_{1,8,2}\ \ i_{1,6,3}\ \ i_{1,7,3}\ \ i_{1,8,3}\ \ i_{1,6,4}\ \ i_{1,7,4}\ \ i_{1,8,4}] & v=4 \end{cases}$$

$$i_2 = \begin{cases} [i_{2,3,1}\ \ i_{2,4,1}\ \ i_{2,5,1}] & v=1 \\ [i_{2,3,1}\ \ i_{2,4,1}\ \ i_{2,5,1}\ \ i_{2,3,2}\ \ i_{2,4,2}\ \ i_{2,5,2}] & v=2 \\ [i_{2,3,1}\ \ i_{2,4,1}\ \ i_{2,5,1}\ \ i_{2,3,2}\ \ i_{2,4,2}\ \ i_{2,5,2}\ \ i_{2,3,3}\ \ i_{2,4,3}\ \ i_{2,5,3}] & v=3 \\ [i_{2,3,1}\ \ i_{2,4,1}\ \ i_{2,5,1}\ \ i_{2,3,2}\ \ i_{2,4,2}\ \ i_{2,5,2}\ \ i_{2,3,3}\ \ i_{2,4,3}\ \ i_{2,5,3}\ \ i_{2,3,4}\ \ i_{2,4,4}\ \ i_{2,5,4}] & v=4 \end{cases}$$

The 2L antenna ports are selected by the index $i_{1,1}$.

Parameters $N_3$, $M_v$, $M_{initial}$ (for $N_3>19$) and $K_0$ are defined as in clause 5.2.2.2.5.

For layer l, l=1, . . . , v, the strongest coefficient $i_{1,8,l}$, the amplitude coefficient indicators $i_{2,3,l}$ and $i_{2,4,l}$, the phase coefficient indicator $i_{2,5,l}$ and the bitmap indicator $i_{1,7,l}$ are defined and indicated, where the mapping from $$k_{l,p}^{(1)}$$

to the amplitude coefficient $$p_{l,p}^{(1)}$$

is given in Table 9 and the mapping from $$k_{l,i,f}^{(2)}$$

to the amplitude coefficient $$p_{l,i,f}^{(2)}$$

is given in Table 10.

The number of nonzero coefficients for layer l, $$K_l^{NZ},$$

and the total number of nonzero coefficients $K^{NZ}$ are defined.

The amplitude coefficients $$p_l^{(1)} \text{ and } p_l^{(2)}\ (l = 1, \ldots, \upsilon)$$

are represented.

The amplitude and phase coefficient indicators are reported.

Codebook indicators $i_{1,5}$ and $i_{1,6,l}$ (l=1, . . . , v) are found.

The codebooks for 1-4 layers are given in Table 15, where $v_m$ is a $P_{CSI\text{-}RS}/2$-element column vector containing a value of 1 in element (m mod $P_{CSI\text{-}RS}/2$) and zeros elsewhere (where the first element is element 0), and the quantities $\varphi_{l,i,f}$ and $y_{t,l}$ are defined.

amplitude and phase are set to zero, i.e., $$p_{l,i,f}^{(2)} = 0 \text{ and } \varphi_{l,i,f} = 0.$$

Regarding UE sounding reference signal ("SRS") configuration, in one embodiment, as discussed in 3GPP TS 38.214, the UE may be configured with one or more SRS resource sets as configured by the higher-layer parameter SRS-ResourceSet, wherein each SRS resource set is associated with K≥1 SRS resources (higher-layer parameter SRS-Resource), where the maximum value of K is indicated by UE capability. The SRS resource set applicability is configured by the higher-layer parameter usage in SRS-ResourceSet. The higher-layer parameter SRS-Resource configures some SRS parameters, including the SRS resource configuration identity (srs-ResourceId), the number of SRS ports (nrofSRS-Ports) with default value of one, and the time-domain behavior of SRS resource configuration (resourceType).

TABLE 15

Codebook for 1-layer. 2-layer, 3-layer and 4-layer CSI reporting using antenna ports 3000 to 2999 + PCSI-RS

| Layers | |
|---|---|
| υ = 1 | $W^{(1)}_{i_{1,1},n_{3,1},p_1^{(1)},p_1^{(2)},i_{2,5,1},t} = W^{1}_{i_{1,1},n_{3,1},p_1^{(1)},p_1^{(2)},i_{2,5,1},t}$ |
| υ = 2 | $W^{(2)}_{i_{1,1},n_{3,1},p_1^{(1)},p_1^{(2)},i_{2,5,1},n_{3,2},p_2^{(1)},p_2^{(2)},i_{2,5,2},t} = \frac{1}{\sqrt{2}}\begin{bmatrix} W^{1}_{i_{1,1},n_{3,1},p_1^{(1)},p_1^{(2)},i_{2,5,1},t} & W^{2}_{i_{1,1},n_{3,2},p_2^{(1)},p_2^{(2)},i_{2,5,2},t}\end{bmatrix}$ |
| υ = 3 | $W^{(3)}_{i_{1,1},n_{3,1},p_1^{(1)},p_1^{(2)},i_{2,5,1},n_{3,2},p_2^{(1)},p_2^{(2)},i_{2,5,2},n_{3,3},p_3^{(1)},p_3^{(2)},i_{2,5,3},t} = \frac{1}{\sqrt{3}}\begin{bmatrix} W^{1}_{i_{1,1},n_{3,1},p_1^{(1)},p_1^{(2)},i_{2,5,1},t} & W^{2}_{i_{1,1},n_{3,2},p_2^{(1)},p_2^{(2)},i_{2,5,2},t} & W^{3}_{i_{1,1},n_{3,3},p_3^{(1)},p_3^{(2)},i_{2,5,3},t}\end{bmatrix}$ |
| υ = 4 | $W^{(4)}_{i_{1,1},n_{3,1},p_1^{(1)},p_1^{(2)},i_{2,5,1},n_{3,2},p_2^{(1)},p_2^{(2)},i_{2,5,2},n_{3,3},p_3^{(1)},p_3^{(2)},i_{2,5,3},n_{3,4},p_4^{(1)},p_4^{(2)},i_{2,5,4},t} = \frac{1}{2}\begin{bmatrix} W^{1}_{i_{1,1},n_{3,1},p_1^{(1)},p_1^{(2)},i_{2,5,1},t} & W^{2}_{i_{1,1},n_{3,2},p_2^{(1)},p_2^{(2)},i_{2,5,2},t} & W^{3}_{i_{1,1},n_{3,3},p_3^{(1)},p_3^{(2)},i_{2,5,3},t} & W^{4}_{i_{1,1},n_{3,4},p_4^{(1)},p_4^{(2)},i}\end{bmatrix}$ |

Where $$W^{l}_{i_{1,1},n_3,p_l^{(1)},p_l^{(2)},i_{2,5,l},t} = \frac{1}{\sqrt{\gamma_{t,l}}}\begin{bmatrix} \sum_{i=0}^{L-1} v_{i_{1,1}d+i}\, p_{l,0}^{(1)} \sum_{f=0}^{M_\upsilon-1} y_{t,l}^{(f)}\, p_{l,i,f}^{(2)} \varphi_{l,i,f} \\ \sum_{i=0}^{L-1} v_{i_{1,1}d+i}\, p_{l,1}^{(1)} \sum_{f=0}^{M_\upsilon-1} y_{t,l}^{(f)}\, p_{l,i+L,f}^{(2)} \varphi_{l,i+L,f} \end{bmatrix}, l = 1, 2, 3, 4,$$

$$\gamma_{t,l} = \sum_{i=0}^{2L-1} \left(p_{l,\lfloor \frac{i}{L} \rfloor}^{(1)}\right)^2 \left| \sum_{f=0}^{M_\upsilon-1} y_{t,l}^{(f)}\, p_{l,i,f}^{(2)} \varphi_{l,i,f} \right|^2$$

and the mappings from $i_1$ to $i_{1,1}$, $n_{3,1}$, $n_{3,2}$, $n_{3,3}$, $n_{3,4}$, and from $i_2$ to $i_{2,5,1}$, $i_{2,5,2}$, $i_{2,5,3}$, $i_{2,5,4}$, $p_1^{(1)}$, $p_2^{(1)}$, $p_3^{(1)}$ and $p_4^{(1)}$, $p_1^{(2)}$, $p_2^{(2)}$, $p_3^{(2)}$ and $p_4^{(2)}$ are as described above, including the ranges of the of the constituent indices of $i_1$ and $i_2$.

For coefficients with $$k_{l,i,f}^{(3)} = 0,$$

The UE may be configured by the higher-layer parameter resourceMapping in SRS-Resource with an SRS resource occupying $N_S \in \{1,2,4\}$ adjacent symbols within the last 6 symbols of the slot, where all antenna ports of the SRS resources are mapped to each symbol of the resource.

For a UE configured with one or more SRS resource configuration(s), and when the higher-layer parameter resourceType in SRS-Resource is set to 'aperiodic':

a. The UE receives a configuration of SRS resource sets,
b. The UE receives a downlink DCI, a group common DCI, or an uplink DCI based command where a codepoint of the DCI may trigger one or more SRS resource set(s). For SRS in a resource set with usage set to 'codebook' or 'antennaSwitching', the minimal time interval between the last symbol of the PDCCH triggering the aperiodic SRS transmission and the first symbol of SRS resource is $N_2$. Otherwise, the minimal time interval between the last symbol of the PDCCH triggering the aperiodic SRS transmission and the first symbol of SRS resource is $N_2+14$. The minimal time interval in units of OFDM symbols is counted based on the minimum subcarrier spacing between the PDCCH and the aperiodic SRS.
c. If the UE is configured with the higher-layer parameter spatialRelationInfo containing the ID of a reference 'ssb-Index', the UE shall transmit the target SRS resource with the same spatial domain transmission filter used for the reception of the reference SS/PBCH block, if the higher-layer parameter spatialRelationInfo contains the ID of a reference 'csi-RS-Index', the UE shall transmit the target SRS resource with the same spatial domain transmission filter used for the reception of the reference periodic CSI-RS or of the reference semi-persistent CSI-RS, or of the latest reference aperiodic CSI-RS. If the higher-layer parameter spatialRelationInfo contains the ID of a reference 'srs', the UE shall transmit the target SRS resource with the same spatial domain transmission filter used for the transmission of the reference periodic SRS or of the reference semi-persistent SRS or of the reference aperiodic SRS.
d. The update command contains spatial relation assumptions provided by a list of references to reference signal IDs, one per element of the updated SRS resource set. Each ID in the list refers to a reference SS/PBCH block, NZP CSI-RS resource configured on serving cell indicated by Resource Serving Cell ID field in the update command if present, same serving cell as the SRS resource set otherwise, or SRS resource configured on serving cell and uplink bandwidth part indicated by Resource Serving Cell ID field and Resource BWP ID field in the update command if present, same serving cell and bandwidth part as the SRS resource set otherwise.
e. When the UE is configured with the higher-layer parameter usage in SRS-ResourceSet set to 'antennaSwitching', the UE shall not expect to be configured with different spatial relations for SRS resources in the same SRS resource set.

For PUCCH and SRS on the same carrier, a UE shall not transmit SRS when semi-persistent and periodic SRS are configured in the same symbol(s) with PUCCH carrying only CSI report(s), or only L1-RSRP report(s), or only L1-SINR report(s). A UE shall not transmit SRS when semi-persistent or periodic SRS is configured or aperiodic SRS is triggered to be transmitted in the same symbol(s) with PUCCH carrying HARQ-ACK, link recovery request and/or SR. In the case that SRS is not transmitted due to overlap with PUCCH, only the SRS symbol(s) that overlap with PUCCH symbol(s) are dropped. PUCCH shall not be transmitted when aperiodic SRS is triggered to be transmitted to overlap in the same symbol with PUCCH carrying semi-persistent/periodic CSI report(s) or semi-persistent/periodic L1-RSRP report(s) only, or only L1-SINR report(s).

When the UE is configured with the higher-layer parameter usage in SRS-ResourceSet set to 'antennaSwitching', and a guard period of Y symbols is configured, the UE shall use the same priority rules as defined above during the guard period as if SRS was configured.

Regarding UE sounding procedure for DL CSI acquisition, when the UE is configured with the higher-layer parameter usage in SRS-ResourceSet set as 'antennaSwitching', the UE may be configured with one configuration depending on the indicated UE capability supportedSRS-TxPortSwitch, which takes on the values { 't1r2', 't1r1-t1r2', 't2r4', 't1r4', 't1r1-t1r2-t1r4', 't1r4-t2r4', 't1r1-t1r2-t2r2-t2r4', 't1r1-t1r2-t2r2-t1r4-t2r4', 't2r2', 't1r1-t2r2', 't4r4', 't1r1-t2r2-t4r4'} a. For 1T2R, up to two SRS resource sets configured with a different value for the higher-layer parameter resourceType in SRS-ResourceSet set, where each set has two SRS resources transmitted in different symbols, each SRS resource in a given set consisting of a single SRS port, and the SRS port of the second resource in the set is associated with a different UE antenna port than the SRS port of the first resource in the same set, or
b. For 2T4R, up to two SRS resource sets configured with a different value for the higher-layer parameter resourceType in SRS-ResourceSet set, where each SRS resource set has two SRS resources transmitted in different symbols, each SRS resource in a given set consisting of two SRS ports, and the SRS port pair of the second resource is associated with a different UE antenna port pair than the SRS port pair of the first resource, or
c. For 1T4R, zero or one SRS resource set configured with higher-layer parameter resourceType in SRS-ResourceSet set to 'periodic' or 'semi-persistent' with four SRS resources transmitted in different symbols, each SRS resource in a given set consisting of a single SRS port, and the SRS port of each resource is associated with a different UE antenna port, and
d. For 1T4R, zero or two SRS resource sets each configured with higher-layer parameter resourceType in SRS-ResourceSet set to 'aperiodic' and with a total of four SRS resources transmitted in different symbols of two different slots, and where the SRS port of each SRS resource in the given two sets is associated with a different UE antenna port. The two sets are each configured with two SRS resources, or one set is configured with one SRS resource and the other set is configured with three SRS resources.
e. For 1T=1R, or 2T=2R, or 4T=4R, up to two SRS resource sets each with one SRS resource, where the number of SRS ports for each resource is equal to 1, 2, or 4.

The UE is configured with a guard period of Y symbols, in which the UE does not transmit any other signal, in the case the SRS resources of a set are transmitted in the same slot. The guard period is in-between the SRS resources of the set. The value of Y is 2 when the OFDM sub-carrier spacing is 120 kHz, otherwise Y=1.

For 1T2R, 1T4R or 2T4R, the UE shall not expect to be configured or triggered with more than one SRS resource set with higher-layer parameter usage set as 'antennaSwitching' in the same slot. For 1T=1R, 2T=2R or 4T=4R, the UE shall not expect to be configured or triggered with more than one SRS resource set with higher-layer parameter usage set as 'antennaSwitching' in the same symbol.

In general, for the solutions discussed herein, a UE is configured by higher-layers with one or more CSI-Report-Config Reporting Settings, wherein each Reporting Setting may configure at least one CodebookConfig Codebook Configuration or one reportQuantity Reporting Quantity, or both, for CSI Reporting. Each Codebook Configuration represents at least one codebookType Codebook type, which includes indicators representing at least one or more of a CSI-RS Resource Indicator ("CRI"), a Synchronization-Signal Block Resource Indicator ("SSBRI"), a Rank Indicator ("RI"), a Precoding Matrix Indicator ("PMI"), a Channel Quality Indicator ("CQI"), a Layer Indicator ("LI"), a Layer-1 Reference Signal Received Power "(L1-RSRP") and a Layer-1 Signal-to-Interference-plus-Noise Ratio ("L1-SINR"). Several embodiments are described below. According to a possible embodiment, one or more elements or features from one or more of the described embodiments may be combined.

Regarding indication of reciprocity-based codebook, the network may configure a UE with a reciprocity-based codebook as part of CSI feedback reporting, via one or more of the indications discussed below with reference to FIGS. 2-4.

FIG. 2 depicts an example of ASN.1 code for configuring the UE with a reciprocity-based codebook, according to a first alternative. According to the first alternative, the network introduces one or more additional values to the higher-layer parameter CodebookType. In one embodiment, the parameter CodebookType may be part of one or more Codebook Configuration Information Elements ("IE") that were introduced in Rel. 15 and Rel. 16 i.e., CodebookConfig, or CodebookConfig-r16, respectively. In another embodiment, a new Codebook Configuration is introduced in Rel. 17, i.e.,CodebookConfig-r17. All the Codebook Configuration IEs are part of the CSI-ReportConfig Reporting Setting IE. Examples of the additional values of the CodebookType parameter are 'typeII-PortSelection-r17', or 'typeII-Reciprocity'. An example of the ASN.1 code that corresponds to the latter embodiment is provided in FIG. 2 for the Codebook Configuration IE. The original ASN.1 code for this IE can be found in Clause 6.3.2 of 3GPP TS 38.331.

FIG. 3 depicts an example of ASN.1 code for configuring the UE with a reciprocity-based codebook, according to a second alternative. According to the second alternative, the network introduces an additional higher-layer parameter, e.g., channelReciprocity, within the CSI-ReportConfig Reporting Setting IE that configures the UE with CSI feedback reporting based on channel reciprocity. The Channel Reciprocity parameter may appear in different sub-elements of the Reporting Setting IE. An Example of the ASN.1 code that corresponds to this embodiment is provided in FIG. 3 for the CSI-ReportConfig Reporting Setting IE. The original ASN.1 code for this IE can be found in Clause 6.3.2 of 3GPP TS 38.331.

FIG. 4 depicts an example of ASN.1 code for configuring the UE with a reciprocity-based codebook, according to a third alternative. According to the third alternative, the network introduces an additional higher-layer parameter, e.g., channelReciprocity, within the Codebook Configuration CodebookConfig IE. In one embodiment, the new parameter is under the Codebook Configuration IE, e.g., CodebookConfig, CodebookConfig-r16. In another embodiment, the new parameter is under a new configuration such as CodebookConfig-r17. In yet another embodiment, the new parameter is a sub-parameter within the higher-layer parameter codebookType, whenever the Codebook Type is set to 'typeII-PortSelection', 'typeII-PortSelection-r16' or another Type-II Port Selection Codebook, e.g., 'typeII-PortSelection-r17'. An Example of the ASN.1 code that corresponds to the last embodiment is provided in FIG. 4 for the CodebookConfig Codebook Configuration IE. The original ASN.1 code for this IE can be found in Clause 6.3.2 of 3GPP TS 38.331.

Regarding the structure of reciprocity-based codebook, due to the exploitation of the FDD reciprocity of the channel, a gNB may transmit beamformed CSI-RSs, where the CSI-RS beamforming is based on the UL channel estimated via SRS transmission. The beamforming can then flatten the channel in the frequency domain, i.e., a fewer number of significant channel taps, i.e., taps with relatively large power, are observed at the UE, compared with non-beamformed CSI-RS transmission. Such beamforming may result in a fewer number of coefficients, corresponding to fewer FD basis indices, being fed back in the CSI report. In the sequel, we exploit different codebook designs that exploit channel reciprocity to reduce the overall CSI feedback overhead. Several embodiments are described below. According to a possible embodiment, one or more elements or features from one or more of the described embodiments may be combined.

Regarding port selection matrix, In both Rel. 15 and Rel. 16 Type-II Port Selection codebooks, $v_m v_{i_{1,1}d+i}$ is defined as a $P_{CSI\text{-}RS}/2$-element column vector containing a value of 1 in element (m mod $P_{CSI\text{-}RS}/2$), and zeros elsewhere (where the first element is element 0), where $v_{i_{1,1}d+i}$ can be found in the term $$W^{l}_{i_{1,1},p_l^{(1)},p_l^{(2)},i_{2,1,l}}$$

for Rel. 15 Type-II Port Selection Codebook (Clause 5.2.2.2.4) and in the term $$W^{l}_{i_{1,1},n_3,p_l^{(1)},p_l^{(2)},i_{2,5,l},t}$$

for Rel. 16 Type-II Port Selection Codebook (Clause 5.2.2.2.6) for the per-layer (l=1, . . . , v) codebook expression. In this section, we address enhancements to the port selection matrix for similar (yet not necessarily identical) codebook structures, as follows.

In a first embodiment, the port selection vector $v_m$ is common across both polarizations and all layers, wherein $v_m$ is a $P_{CSI\text{-}RS}/2$-element column vector containing a value of 1 in element m (where m=0, 1, . . . , $P_{CSI\text{-}RS}/2-1$), and zeros elsewhere (where the first element is element 0).

In a first example, the index m in $v_m$ is in the form $m=i_{1,1}d+i$, where d is configured with a higher layer parameter such that $d\in\{1,2,3,4\}$ and $$d \le \min\left(\frac{P_{CSI-RS}}{2}, L\right),$$

and the index i represents the beam index (where i=0, 1, . . . , L−1) and $i_{1,1}$ is reported in the CSI report, taking on the values $i_{1,1}\in$ $$\left\{0, 1, \ldots, \left\lceil \frac{P_{CSI-RS}}{2d} \right\rceil - 1\right\},$$

which implies the term $i_{1,1}$ can take on $$\left\lceil \frac{P_{CSI-RS}}{2d} \right\rceil$$

values, and hence represented with $$\left\lceil \log_2 \left\lceil \frac{P_{CSI-RS}}{2d} \right\rceil \right\rceil$$

bits.

In a second example, the index m in $v_m$ is in the form $m=b_{1,1,i}$ and the index i represents the beam index (where i=0, 1, . . . , L-1) and $b_{1,1,i}$, is reported in the CSI report, taking on the values $b_{1,1,i} \in$ $$\left\{0, 1, \ldots, \frac{P_{CSI-RS}}{2} - 1\right\},$$

wherein each beam is associated with an exclusive port, i.e., $\{b_{1,1,0}, b_{1,1,1}, \ldots, b_{1,1,L-1}\}$ are represented by $$\binom{P_{CSI-RS}/2}{L}$$

values, and hence represented with $$\left\lceil \log_2 \binom{P_{CSI-RS}/2}{L} \right\rceil$$

bits.

In a third example, the index m in $v_m$ is in the form $m=b_{1,1,i}$, and the index i represents the beam index (where i=0, 1, . . . , L−1) and $b_{1,1,i}$, is reported in the CSI report, taking on the values $b_{1,1,i} \in$ $$\left\{0, 1, \ldots, \frac{P_{CSI-RS}}{2} - 1\right\},$$

wherein each beam is associated with a non-exclusive port, i.e., $\{b_{1,1,0}, b_{1,1,1}, \ldots, b_{1,1,L-1}\}$ are represented by $(P_{CSI-RS}/2)^L$ values, and hence represented with L. $[\log_2(P_{CSI-RS}/2)]$ bits.

In a second embodiment, the port selection vector $v_m$ depends on the polarization index, i.e., $v_m$ is replaced with $v_{m_0}$, $v_{m_1}$ for the first and second polarizations, respectively, wherein $v_{m_s}$ (for s=0,1) is a $P_{CSI-RS}/2$-element column vector containing a value of 1 in element $m_s$ (where ms=0, 1, . . . , $P_{CSI-RS}/2-1$), and zeros elsewhere (where the first element is element 0).

In a first example, the index $m_s$ in $v_{m_s}$ (for s=0,1) is in the form $m_s=i_{1,1,s}d+i$, where d is configured with a higher layer parameter such that $d \in \{1,2,3,4\}$ and $$d \leq \min\left(\frac{P_{CSI-RS}}{2}, L\right),$$

and the index i represents the beam index (where i=0, 1, . . . , L−1) and the two parameters $i_{1,1,0}$, $i_{1,1,1}$ are reported in the CSI report, taking on the values $i_{1,1,s} \in$ $$\left\{0, 1, \ldots, \left\lceil \frac{P_{CSI-RS}}{2d} \right\rceil - 1\right\},$$

which implies each term $i_{1,1,s}$ can take on $$\left\lceil \frac{P_{CSI-RS}}{2d} \right\rceil$$

values, and hence represented with $$\left\lceil \log_2 \left\lceil \frac{P_{CSI-RS}}{2d} \right\rceil \right\rceil$$

bits (a total of 2.

$$\left\lceil \log_2 \left\lceil \frac{P_{CSI-RS}}{2d} \right\rceil \right\rceil$$

bits for polarizations).

In a second example, the index $m_s$ in $v_{m_s}$ (for s=0,1) is in the form $m_s=b_{sL+i}$, and the index i represents the beam index (where i=0, 1, . . . , L−1) and $b_{sL+i}$, is reported in the CSI report, taking on the values $b_i \in \{0, 1, \ldots, P_{CSI-RS}/2-1\}$ and $$b_{sL+i} \in \left\{\frac{P_{CSI-RS}}{2}, \ldots, P_{CSI-RS} - 1\right\}$$

for s=0, 1, respectively, wherein each beam is associated with an exclusive port, i.e., $\{b_{sL}, b_{sL+1}, \ldots, b_{sL+L-1}\}$ are represented by $$\binom{P_{CSI-RS}/2}{L}$$

values, and hence represented with $$\left\lceil \log_2 \binom{P_{CSI-RS}/2}{L} \right\rceil$$

bits (a total of 2.

$$\left\lceil \log_2 \binom{P_{CSI-RS}/2}{L} \right\rceil$$

bits for both polarizations).

In a third example, the index $m_s$ in $v_{m_s}$ (for s=0,1) is in the form $m_s=b_{sL+i}$, and the index i represents the beam index (where i=0, 1, . . . , L−1) and $b_{sL+i}$, is reported in the CSI report, taking on the values $b_i \in \{0, 1, \ldots, P_{CSI\text{-}RS}/2-1\}$ and $b_{sL+i} \in$ $$b_{sL+i} \in \left\{\frac{P_{CSI-RS}}{2}, \ldots, P_{CSI-RS}-1\right\}$$

for s=0, 1, respectively, wherein each beam is associated with a non-exclusive port, i.e., $\{b_{sL}, b_{sL+1}, \ldots, b_{sL+L-1}\}$ are represented by $(P_{CSI\text{-}RS}/2)^L$ values, and hence represented with L. $\lceil \log_2(P_{CSI\text{-}RS}/2)\rceil$ bits (a total of 2L. $\lceil \log_2(P_{CSI\text{-}RS}/2)\rceil$ bits for both polarizations).

In a third embodiment, the port selection vector $v_m$ depends on the layer index, i.e., $v_m$ is replaced with $v_{m^l}$ (for layers l=1, . . . , $N_{layers}$), wherein $N_{layers}$ is the total number of layers 25 supported in the codebook. Thereby, $v_{m^l}$ becomes a $P_{CSI\text{-}RS}/2$-element column vector containing a value of 1 in element $m^l$ (where $m_s$=0, 1, . . . , $P_{CSI\text{-}RS}/2-1$), and zeros elsewhere (where the first element is element 0). In a first example, the index $m^l$ in $v_{m^l}$ (for layers l=1, . . . , $N_{layers}$) is in the form $m^l = i_{1,1}{}^l d+i$, where d is configured with a higher layer parameter such that $d \in \{1,2,3,4\}$ and $$d \le \min\left(\frac{P_{CSI-RS}}{2}, L\right),$$

and the index l represents the layer index (where l=1, . . . , $N_{layers}$) and the parameters $$i_{1,1}^1, \ldots, i_{1,1}^{N_{layers}}$$

are reported in the CSI report, taking on the values $$i_{1,1}^l \in \left\{0, 1, \ldots, \left\lceil\frac{P_{CSI-RS}}{2d}\right\rceil - 1\right\},$$

which implies each term $$i_{1,1}^l$$

can take on $$\left\lceil\frac{P_{CSI-RS}}{2d}\right\rceil$$

values, and hence represented with $$\left\lceil\log_2\left\lceil\frac{P_{CSI-RS}}{2d}\right\rceil\right\rceil$$

bits (a total of $N_{layers}$.

$$\left\lceil\log_2\left\lceil\frac{P_{CSI-RS}}{2d}\right\rceil\right\rceil$$

bits for all layers).

In a second example, the index $m^l$ in $v_{m^l}$ (for layers l=1, . . . , $N_{layers}$) is in the form $m^l = b_i^l$, and the index i represents the beam index (where i=0, 1, . . . , L−1) and $$b_i^l$$

is reported in the CSI report, taking on the values $$b_i^l \in \{0, 1, \ldots, P_{CSI-RS}/2-1\},$$

wherein each beam is associated with an exclusive port, i.e., $$\{b_i^1, \ldots, b_i^{N_{layers}}\}$$

are represented by $$\binom{P_{CSI-RS}/2}{L}$$

values, and hence represented with $$\left\lceil\log_2\binom{P_{CSI-RS}/2}{L}\right\rceil$$

bits (a total of $$N_{layers} \cdot \left\lceil\log_2\binom{P_{CSI-RS}/2}{L}\right\rceil$$

bits for all layers).

In a third example, the index $m^l$ in $v_{m^l}$ (for layers l=1, . . . , $N_{layers}$) is in the form $$m^l = b_i^l,$$

and the index i represents the beam index (where i=0, 1, . . . , L−1) and $$b_i^l$$

is reported in the CSI report, taking on the values $$b_i^l \in \{0, 1, \ldots, P_{CSI-RS}/2-1\},$$

wherein each beam is associated with a non-exclusive port, i.e., $$\{b_i^1, \ldots, b_i^{N_{layers}}\}$$

are represented by $$\left(P_{CSI-RS}/2\right)^{L}$$

values, and hence represented with L.

$$\left\lceil \log_2\left(P_{CSI-RS}/2\right)\right\rceil$$

bits (a total of $LN_{layers}$.

$$\left\lceil \log_2\left(P_{CSI-RS}/2\right)\right\rceil$$

bits for all layers).

In a fourth embodiment, the port selection vector $v_m$ depends on both the polarization index and the layer index, i.e., $v_m$ is replaced with $$v_{m_0^l}, v_{m_1^l}$$

for the first and second polarizations of layer l (for l=1, . . . , $N_{layers}$), Thereby, $$v_{m_s^l} \text{ (for } s = 0, 1)$$

becomes a $P_{CSI-RS}/2$-element column vector containing a value of 1 in element $$m_s^l \text{ (where } m_s^l = 0, 1, \ldots , P_{CSI-RS}/2-1),$$

and zeros elsewhere (where the first element is element 0).

In light of the prior three examples, an indication for each polarization/layer pair is needed, with a total of $2N_{layers}$.

$$2N_{layers}\cdot\left\lceil \log_2\left\lceil \frac{P_{CSI-RS}}{2d}\right\rceil\right\rceil$$

bits, $2N_{layers}$.

$$2N_{layers}\cdot\left\lceil \log_2\binom{P_{CSI-RS}/2}{L}\right\rceil$$

bits, and $2LN_{layers}$.

$$\left\lceil \log_2\left(P_{CSI-RS}/2\right)\right\rceil$$

bits for the extensions of the first, second and third examples, respectively.

Note that the third and fourth embodiments can be applied to layer groups rather than layers, wherein layers within a layer group share the same port selection matrix structure and port selection matrix indicator(s), e.g., when Nlayers=4, the first layer and second layer (if applicable) would correspond to the first layer group and would have a common port selection matrix structure and would share common port selection matrix indicator(s), whereas the third and fourth layers (if applicable) would correspond to the second layer group and would have a common port selection matrix structure and would share common port selection matrix indicator(s).

Regarding linear combination coefficients, in both Rd. 15 and Rd. 16 Type-II Port Selection codebooks, each non-zero linear combination coefficient is represented by up to three parameters, $p^{(1)}$, $p^{(2)}$, and $\varphi$ for a first stage amplitude quantization, a second stage amplitude quantization and phase quantization, respectively. In Rd. 15, the first stage amplitude quantization is common for coefficients representing all PMI sub-bands in a given beam/polarization/layer triplet, i.e., for a common beam with the same polarization and under the same layer, the first stage quantization coefficient is the same. In Rd. 16, the first stage amplitude quantization is common for coefficients representing all PMI sub-bands in a given polarization/layer pair, i.e., for the same polarization and under the same layer, the first stage quantization coefficient is the same. In this section, we address enhancements to the linear combination coefficients' quantization and reporting, as follows.

In a first embodiment, a first stage amplitude indicator, a second stage amplitude indicator and a phase indicator exist for each non-zero coefficient. In one example, the first stage amplitude indicator is common for all coefficients per layer/polarization pair, and the second stage amplitude indicators and phase indicators vary across one or more of the layer, polarization and frequency domain basis indices within a frequency band, e.g., bandwidth part. Under this example, the first and second stage amplitude coefficient indicators $i_{2,3,l}$ and $i_{2,4,l}$ for layers l=1, . . . , v are in the form $$i_{2,3,l} = \left[\,k_{l,0}^{(1)} \;\; k_{l,1}^{(1)}\,\right]$$

$$i_{2,4,l} = \left[k_{l,0}^{(2)} \;\ldots\; k_{l,M_v-1}^{(2)}\right]$$

$$k_{l,f}^{(2)} = \left[k_{l,0,f}^{(2)} \;\ldots\; k_{l,2L-1,f}^{(2)}\right]$$

$$k_{l,p}^{(1)} \in \{1, \ldots , K_1\}$$

$$k_{l,i,f}^{(2)} \in \{1, \ldots , K_2\}.$$

The phase coefficient indicator $i_{2,5,l}$ is $$i_{2,5,l} = \left[c_{l,0} \;\ldots\; c_{l,M_v-1}\right]$$

$$c_{l,f} = \left[c_{l,0,f} \;\ldots\; c_{l,2L-1,f}\right]$$

$$c_{l,i,f} \in \{0, \ldots , K_3 - 1\}$$

Note that each of the possible values $$k_{l,p}^{(1)} \in \{1, \ldots , K_1\} \text{ and } k_{l,i,f}^{(2)} \in \{0, \ldots , K_2\}$$

map to quantization values $$p_{l,p}^{(1)}, p_{l,i,f}^{(2)},$$

respectively, similar to Table 9 and Table 10, and $C_{l,i,f}$ is mapped to $$\varphi_{l,i,f}=e^{j\frac{2\pi c_{l,i,f}}{K_3}},$$

where f={1,2, . . . , $N_f$} represents an index associated with a (possibly transformed) frequency domain basis of size $N_f$.

In a second embodiment, a single stage amplitude indicator and a phase indicator exist for each non-zero coefficient, wherein the single stage amplitude indicator is common for all coefficients per layer/polarization pair, and the phase indicators vary across one or more of the layer, polarization and frequency domain basis indices within a frequency band, e.g., bandwidth part. Under this example, the amplitude coefficient indicators $i_{2,3,l}$ for layers l=1, . . . , v are in the form $$i_{2,3,l}=\left[k_{l,0}^{(1)}\ \ k_{l,1}^{(1)}\right]$$
$$k_{l,p}^{(1)}\in\{1,\ \ldots\ ,K_1\}$$

The phase coefficient indicator $i_{2,5,l}$ is $$i_{2,5,l}=\left[c_{l,0}\ \ldots\ c_{l,M_\upsilon-1}\right]$$
$$c_{l,f}=\left[c_{l,0,f}\ \ldots\ c_{l,2L-1,f}\right]$$
$$c_{l,i,f}\in\{0,\ \ldots\ ,K_3-1\}$$

Note that each of the possible values $$k_{l,p}^{(1)}\in\{1,\ \ldots\ ,K_1\}$$

map to quantization values $$p_{l,p}^{(1)},$$

similar to Table 9, and $c_{l,i,f}$ is mapped to $$\varphi_{l,i,f}=e^{j\frac{2\pi c_{l,i,f}}{K_3}},$$

where f={1,2, . . . , $N_f$} represents an index associated with a (possibly transformed) frequency domain basis of size $N_f$.

In a third embodiment, a single stage amplitude indicator and a phase indicator exist for each non-zero coefficient, wherein the single stage amplitude indicator is common for all coefficients per beam, layer and polarization triplet, and the phase indicators vary across one or more of the layer, polarization and frequency domain basis indices within a frequency band, e.g., bandwidth part. Under this example, the amplitude coefficient indicators $i_{2,3,l}$ for layers l=1, . . . , v are in the form $$i_{2,3,l}=\left[k_{l,0}^{(1)}\ \ldots\ k_{l,2L-1}^{(1)}\right]$$

-continued $$k_{l,i}^{(1)}\in\{1,\ \ldots\ ,K_1\}.$$

The phase coefficient indicator $i_{2,5,l}$ is $$i_{2,5,l}=\left[c_{l,0}\ \ldots\ c_{l,M_\upsilon-1}\right]$$
$$c_{l,f}=\left[c_{l,0,f}\ \ldots\ c_{l,2L-1,f}\right]$$
$$c_{l,i,f}\in\{0,\ \ldots\ ,K_3-1\}$$

Note that each of the possible values $$k_{l,p}^{(1)}\in\{1,\ \ldots\ ,K_1\}$$

map to quantization values $$p_{l,p}^{(1)},$$

similar to Table 9, and $c_{l,i,f}$ is mapped to $$\varphi_{l,i,f}=e^{j\frac{2\pi c_{l,i,f}}{K_3}},$$

where f={1,2, . . . , $N_f$} represents an index associated with a (possibly transformed) frequency domain basis of size $N_f$.

In a fourth embodiment, only a phase indicator exists for each non-zero coefficient, wherein the phase coefficient indicator $i_{2,5,l}$ is $$i_{2,5,l}=\left[c_{l,0}\ \ldots\ c_{l,M_\upsilon-1}\right]$$
$$c_{l,f}=\left[c_{l,0,f}\ \ldots\ c_{l,2L-1,f}\right]$$
$$c_{l,i,f}\in\{0,\ \ldots\ ,K_3-1\}$$

Note that each of the possible values of $C_{l,i,f}$ is mapped to $$\varphi_{l,i,f}=e^{j\frac{2\pi c_{l,i,f}}{K_3}},$$

where f={1,2, . . . , $N_f$} represents an index associated with a (possibly transformed) frequency domain basis of size N f.

In some embodiments, as used herein, the terms antenna, panel, and antenna panel are used interchangeably. An antenna panel may be a hardware that is used for transmitting and/or receiving radio signals at frequencies lower than 6 GHz, e.g., frequency range 1 ("FR1"), or higher than 6 GHz, e.g., frequency range 2 ("FR2") or millimeter wave (mmWave). In some embodiments, an antenna panel may comprise an array of antenna elements, wherein each antenna element is connected to hardware such as a phase shifter that allows a control module to apply spatial parameters for transmission and/or reception of signals. The resulting radiation pattern may be called a beam, which may or may not be unimodal and may allow the device to amplify signals that are transmitted or received from spatial directions.

In some embodiments, an antenna panel may or may not be virtualized as an antenna port in the specifications. An antenna panel may be connected to a baseband processing module through a radio frequency ("RF") chain for each of transmission (egress) and reception (ingress) directions. A capability of a device in terms of the number of antenna panels, their duplexing capabilities, their beamforming capabilities, and so on, may or may not be transparent to other devices. In some embodiments, capability information may be communicated via signaling or, in some embodiments, capability information may be provided to devices without a need for signaling. In the case that such information is available to other devices, it can be used for signaling or local decision making In some embodiments, a device (e.g., UE, node, TRP) antenna panel may be a physical or logical antenna array comprising a set of antenna elements or antenna ports that share a common or a significant portion of an RF chain (e.g., in-phase/quadrature ("I/Q") modulator, analog to digital ("A/D") converter, local oscillator, phase shift network). The device antenna panel or "device panel" may be a logical entity with physical device antennas mapped to the logical entity. The mapping of physical device antennas to the logical entity may be up to device implementation. Communicating (receiving or transmitting) on at least a subset of antenna elements or antenna ports active for radiating energy (also referred to herein as active elements) of an antenna panel requires biasing or powering on of the RF chain which results in current drain or power consumption in the device associated with the antenna panel (including power amplifier/low noise amplifier ("LNA") power consumption associated with the antenna elements or antenna ports). The phrase "active for radiating energy," as used herein, is not meant to be limited to a transmit function but also encompasses a receive function. Accordingly, an antenna element that is active for radiating energy may be coupled to a transmitter to transmit radio frequency energy or to a receiver to receive radio frequency energy, either simultaneously or sequentially, or may be coupled to a transceiver in general, for performing its intended functionality. Communicating on the active elements of an antenna panel enables generation of radiation patterns or beams.

In some embodiments, depending on device's own implementation, a "device panel" can have at least one of the following functionalities as an operational role of Unit of antenna group to control its Tx beam independently, Unit of antenna group to control its transmission power independently, Unit of antenna group to control its transmission timing independently. The "device panel" may be transparent to gNB. For certain condition(s), gNB or network can assume the mapping between device's physical antennas to the logical entity "device panel" may not be changed. For example, the condition may include until the next update or report from device or comprise a duration of time over which the gNB assumes there will be no change to the mapping. A Device may report its capability with respect to the "device panel" to the gNB or network. The device capability may include at least the number of "device panels". In one implementation, the device may support UL transmission from one beam within a panel; with multiple panels, more than one beam (one beam per panel) may be used for UL transmission. In another implementation, more than one beam per panel may be supported/used for UL transmission.

In some of the embodiments described, an antenna port is defined such that the channel over which a symbol on the antenna port is conveyed can be inferred from the channel over which another symbol on the same antenna port is conveyed.

Two antenna ports are said to be quasi co-located ("QCL") if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters. Two antenna ports may be quasi-located with respect to a subset of the large-scale properties and different subset of large-scale properties may be indicated by a QCL Type. For example, qcl-Type may take one of the following values:

'QCL-TypeA': {Doppler shift, Doppler spread, average delay, delay spread}

'QCL-TypeB': {Doppler shift, Doppler spread}

'QCL-TypeC': {Doppler shift, average delay}

'QCL-TypeD': {Spatial Rx parameter}

Spatial Rx parameters may include one or more of: angle of arrival ("AoA") Dominant AoA, average AoA, angular spread, Power Angular Spectrum ("PAS") of AoA, average AoD (angle of departure), PAS of AoD, transmit/receive channel correlation, transmit/receive beamforming, spatial channel correlation, etc.

The QCL-TypeA, QCL-TypeB and QCL-TypeC may be applicable for all carrier frequencies, but the QCL-TypeD may be applicable only in higher carrier frequencies (e.g., mmWave, FR2 and beyond), where essentially the UE may not be able to perform omni-directional transmission, i.e., the UE would need to form beams for directional transmission. A QCL-TypeD between two reference signals A and B, the reference signal A is considered to be spatially co-located with reference signal B and the UE may assume that the reference signals A and B can be received with the same spatial filter (e.g., with the same RX beamforming weights).

An "antenna port" according to an embodiment may be a logical port that may correspond to a beam (resulting from beamforming) or may correspond to a physical antenna on a device. In some embodiments, a physical antenna may map directly to a single antenna port, in which an antenna port corresponds to an actual physical antenna. Alternately, a set or subset of physical antennas, or antenna set or antenna array or antenna sub-array, may be mapped to one or more antenna ports after applying complex weights, a cyclic delay, or both to the signal on each physical antenna. The physical antenna set may have antennas from a single module or panel or from multiple modules or panels. The weights may be fixed as in an antenna virtualization scheme, such as cyclic delay diversity ("CDD"). The procedure used to derive antenna ports from physical antennas may be specific to a device implementation and transparent to other devices.

In some of the embodiments described, a TCI-state (Transmission Configuration Indication) associated with a target transmission can indicate parameters for configuring a quasi-collocation relationship between the target transmission (e.g., target RS of DM-RS ports of the target transmission during a transmission occasion) and a source reference signal(s) (e.g., SSB/CSI-RS/SRS) with respect to quasi co-location type parameter(s) indicated in the corresponding TCI state. The TCI describes which reference signals are used as QCL source, and what QCL properties can be derived from each reference signal. A device can receive a configuration of a plurality of transmission configuration indicator states for a serving cell for transmissions on the serving cell. In some of the embodiments described, a TCI state comprises at least one source RS to provide a reference (UE assumption) for determining QCL and/or spatial filter.

In some of the embodiments described, a spatial relation information associated with a target transmission can indicate parameters for configuring a spatial setting between the target transmission and a reference RS (e.g., SSB/CSI-RS/SRS). For example, the device may transmit the target transmission with the same spatial domain filter used for reception the reference RS (e.g., DL RS such as SSB/CSI-RS). In another example, the device may transmit the target transmission with the same spatial domain transmission filter used for the transmission of the reference RS (e.g., UL RS such as SRS). A device can receive a configuration of a plurality of spatial relation information configurations for a serving cell for transmissions on the serving cell.

Figure 5:
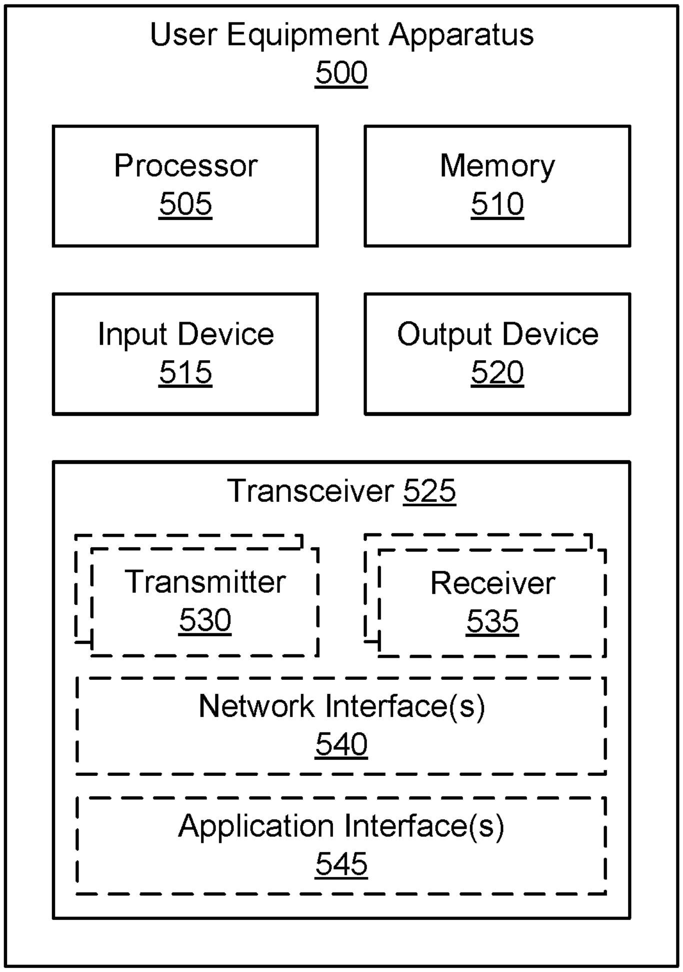
FIG. 5 is a diagram illustrating one embodiment of a user equipment apparatus that may be used for codebook structure for reciprocity-based type-II codebook.

FIG. 5 depicts a user equipment apparatus 500 that may be used for codebook structure for reciprocity-based type-II codebook, according to embodiments of the disclosure. In various embodiments, the user equipment apparatus 500 is used to implement one or more of the solutions described above. The user equipment apparatus 500 may be one embodiment of the remote unit 105 and/or the UE 205, described above. Furthermore, the user equipment apparatus 500 may include a processor 505, a memory 510, an input device 515, an output device 520, and a transceiver 525.

In some embodiments, the input device 515 and the output device 520 are combined into a single device, such as a touchscreen. In certain embodiments, the user equipment apparatus 500 may not include any input device 515 and/or output device 520. In various embodiments, the user equipment apparatus 500 may include one or more of: the processor 505, the memory 510, and the transceiver 525, and may not include the input device 515 and/or the output device 520.

As depicted, the transceiver 525 includes at least one transmitter 530 and at least one receiver 535. In some embodiments, the transceiver 525 communicates with one or more cells (or wireless coverage areas) supported by one or more base units 121. In various embodiments, the transceiver 525 is operable on unlicensed spectrum. Moreover, the transceiver 525 may include multiple UE panel supporting one or more beams. Additionally, the transceiver 525 may support at least one network interface 540 and/or application interface 545. The application interface(s) 545 may support one or more APIs. The network interface(s) 540 may support 3GPP reference points, such as Uu, $N_1$, PC5, etc. Other network interfaces 540 may be supported, as understood by one of ordinary skill in the art.

The processor 505, in one embodiment, may include any known controller capable of executing computer-readable instructions and/or capable of performing logical operations. For example, the processor 505 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 505 executes instructions stored in the memory 510 to perform the methods and routines described herein. The processor 505 is communicatively coupled to the memory 510, the input device 515, the output device 520, and the transceiver 525. In certain embodiments, the processor 505 may include an application processor (also known as "main processor") which manages application-domain and operating system ("OS") functions and a baseband processor (also known as "baseband radio processor") which manages radio functions.

In various embodiments, the processor 505 and/or transceiver 525 controls the user equipment apparatus 500 to implement the above described UE behaviors. In one embodiment, the transceiver 525 receives a channel state information ("CSI") reporting configuration, the CSI reporting configuration comprising a codebook configuration corresponding to a port selection codebook, the port selection codebook corresponding to a precoding matrix indicator ("PMI") comprising a set of one or more layers. In one embodiment, the transceiver 525 receives CSI reference signals ("CSI-RSs") corresponding to a set of CSI-RS ports.

In one embodiment, the processor 505 selects a subset of the CSI-RS ports, the selected subset of CSI-RS ports being common for a subset of the set of one or more layers. In one embodiment, the transceiver 525 reports an indication of the selected subset of the set of CSI-RS ports in a CSI report to a mobile wireless communication network, the indication having a form of a combinatorial function that corresponds to half of the number of the set of CSI-RS ports.

In one embodiment, the subset of the set of one or more layers is the set of one or more layers such that the selected subset of the CSI-RS ports is common across all layers of the set of one or more layers.

In one embodiment, the subset of the set of one or more layers is the set of one or more layers such that the selected subset of the CSI-RS ports is common across all layers of the set of one or more layers.

In one embodiment, a member of the selected subset of the CSI-RS ports takes on values from $$\left\{0, 1, \ldots, \frac{P_{CSI-RS}}{2} - 1\right\}.$$

In one embodiment, the number of bits used to report the indication is calculated as $$\left\lceil \log_2\left(\frac{P_{CSI-RS}/2}{L}\right)\right\rceil,$$

where $P_{CSI-RS}$ is the number of CSI-RS ports and L is a size of the subset of the set of CSI-RS ports.

In one embodiment, a member of a first half of the subset of the set of CSI-RS ports takes on values from $$\left\{0, 1, \ldots, \frac{P_{CSI-RS}}{2} - 1\right\}.$$

and a member of a second half of the subset of the set takes on values from of CSI-RS ports takes on values from $$\left\{\frac{P_{CSI-RS}}{2}, \ldots, P_{CSI-RS} - 1\right\}.$$

In one embodiment, the number of bits used to report the indication is 2.

$$\left\lceil \log_2\left(\frac{P_{CSI-RS}/2}{L}\right)\right\rceil.$$

In one embodiment, the subset of the set of one or more layers comprises one layer.

In one embodiment, the number of bits used to report the indication is $N_{layers}$.

$$\left\lceil \log_2\left(\frac{P_{CSI-RS}/2}{L}\right)\right\rceil$$

bits, wherein $N_{layers}$ is a size of the set of the one or more layers.

In one embodiment, up to two subsets of the set of one or more layers are present, a first subset corresponding to up to the first two layers of the set of one or more layers and a second subset corresponding to one or more layers subsequent to the first two layers of the set of one or more layers.

The memory 510, in one embodiment, is a computer readable storage medium. In some embodiments, the memory 510 includes volatile computer storage media. For example, the memory 510 may include a RAM, including dynamic RAM ("DRAM"), synchronous dynamic RAM ("SDRAM"), and/or static RAM ("SRAM"). In some embodiments, the memory 510 includes non-volatile computer storage media. For example, the memory 510 may include a hard disk drive, a flash memory, or any other suitable non-volatile computer storage device. In some embodiments, the memory 510 includes both volatile and non-volatile computer storage media.

In some embodiments, the memory 510 stores data related to codebook structure for reciprocity-based type-II codebook. For example, the memory 510 may store various parameters, panel/beam configurations, resource assignments, policies, and the like as described above. In certain embodiments, the memory 510 also stores program code and related data, such as an operating system or other controller algorithms operating on the user equipment apparatus 500.

The input device 515, in one embodiment, may include any known computer input device including a touch panel, a button, a keyboard, a stylus, a microphone, or the like. In some embodiments, the input device 515 may be integrated with the output device 520, for example, as a touchscreen or similar touch-sensitive display. In some embodiments, the input device 515 includes a touchscreen such that text may be input using a virtual keyboard displayed on the touchscreen and/or by handwriting on the touchscreen. In some embodiments, the input device 515 includes two or more different devices, such as a keyboard and a touch panel.

The output device 520, in one embodiment, is designed to output visual, audible, and/or haptic signals. In some embodiments, the output device 520 includes an electronically controllable display or display device capable of outputting visual data to a user. For example, the output device 520 may include, but is not limited to, an LCD display, an LED display, an OLED display, a projector, or similar display device capable of outputting images, text, or the like to a user. As another, non-limiting, example, the output device 520 may include a wearable display separate from, but communicatively coupled to, the rest of the user equipment apparatus 500, such as a smart watch, smart glasses, a heads-up display, or the like. Further, the output device 520 may be a component of a smart phone, a personal digital assistant, a television, a table computer, a notebook (laptop) computer, a personal computer, a vehicle dashboard, or the like.

In certain embodiments, the output device 520 includes one or more speakers for producing sound. For example, the output device 520 may produce an audible alert or notification (e.g., a beep or chime). In some embodiments, the output device 520 includes one or more haptic devices for producing vibrations, motion, or other haptic feedback. In some embodiments, all, or portions of the output device 520 may be integrated with the input device 515. For example, the input device 515 and output device 520 may form a touchscreen or similar touch-sensitive display. In other embodiments, the output device 520 may be located near the input device 515.

The transceiver 525 communicates with one or more network functions of a mobile communication network via one or more access networks. The transceiver 525 operates under the control of the processor 505 to transmit messages, data, and other signals and also to receive messages, data, and other signals. For example, the processor 505 may selectively activate the transceiver 525 (or portions thereof) at particular times in order to send and receive messages.

The transceiver 525 includes at least transmitter 530 and at least one receiver 535. One or more transmitters 530 may be used to provide UL communication signals to a base unit 121, such as the UL transmissions described herein. Similarly, one or more receivers 535 may be used to receive DL communication signals from the base unit 121, as described herein. Although only one transmitter 530 and one receiver 535 are illustrated, the user equipment apparatus 500 may have any suitable number of transmitters 530 and receivers 535. Further, the transmitter(s) 530 and the receiver(s) 535 may be any suitable type of transmitters and receivers. In one embodiment, the transceiver 525 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 525, transmitters 530, and receivers 535 may be implemented as physically separate components that access a shared hardware resource and/or software resource, such as for example, the network interface 540.

In various embodiments, one or more transmitters 530 and/or one or more receivers 535 may be implemented and/or integrated into a single hardware component, such as a multi-transceiver chip, a system-on-a-chip, an ASIC, or other type of hardware component. In certain embodiments, one or more transmitters 530 and/or one or more receivers 535 may be implemented and/or integrated into a multi-chip module. In some embodiments, other components such as the network interface 540 or other hardware components/circuits may be integrated with any number of transmitters 530 and/or receivers 535 into a single chip. In such embodiment, the transmitters 530 and receivers 535 may be logically configured as a transceiver 525 that uses one more common control signals or as modular transmitters 530 and receivers 535 implemented in the same hardware chip or in a multi-chip module.

Figure 6:
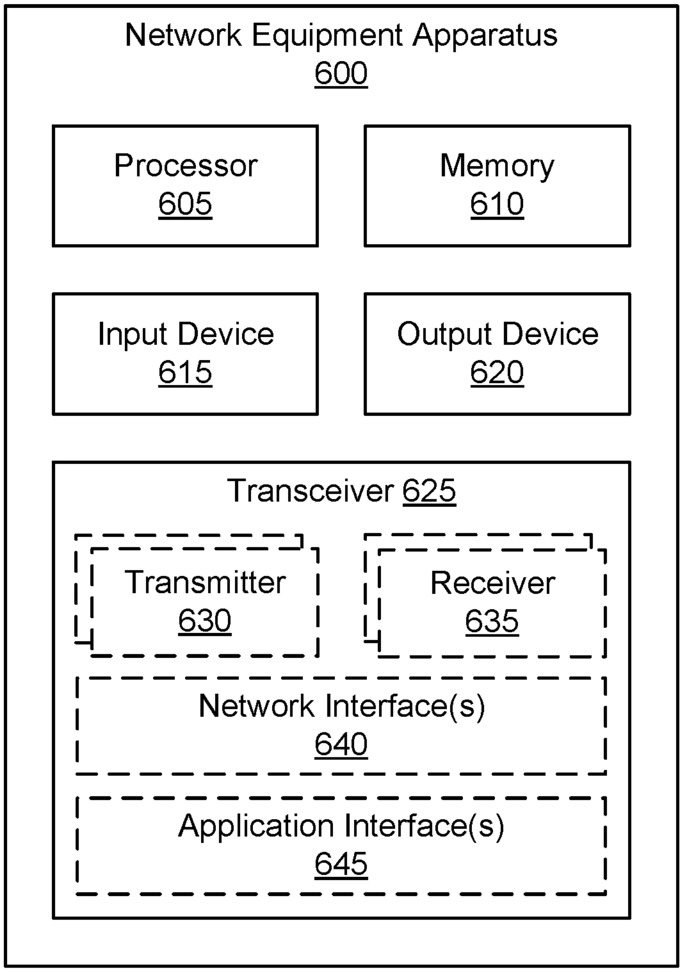
FIG. 6 is a diagram illustrating one embodiment of a network equipment apparatus that may be used for codebook structure for reciprocity-based type-II codebook.

FIG. 6 depicts a network apparatus 600 that may be used for codebook structure for reciprocity-based type-II codebook, according to embodiments of the disclosure. In one embodiment, network apparatus 600 may be one implementation of a RAN node, such as the base unit 121, the RAN node 210, or gNB, described above. Furthermore, the base network apparatus 600 may include a processor 605, a memory 610, an input device 615, an output device 620, and a transceiver 625.

In some embodiments, the input device 615 and the output device 620 are combined into a single device, such as a touchscreen. In certain embodiments, the network apparatus 600 may not include any input device 615 and/or output device 620. In various embodiments, the network apparatus 600 may include one or more of: the processor 605, the memory 610, and the transceiver 625, and may not include the input device 615 and/or the output device 620.

As depicted, the transceiver 625 includes at least one transmitter 630 and at least one receiver 635. Here, the transceiver 625 communicates with one or more remote units 105. Additionally, the transceiver 625 may support at least one network interface 640 and/or application interface 645. The application interface(s) 645 may support one or more APIs. The network interface(s) 640 may support 3GPP reference points, such as Uu, N1, N2 and N3. Other network interfaces 640 may be supported, as understood by one of ordinary skill in the art.

The processor 605, in one embodiment, may include any known controller capable of executing computer-readable instructions and/or capable of performing logical operations. For example, the processor 605 may be a microcontroller, a microprocessor, a CPU, a GPU, an auxiliary processing unit, a FPGA, or similar programmable controller. In some embodiments, the processor 605 executes instructions stored in the memory 610 to perform the methods and routines described herein. The processor 605 is communicatively coupled to the memory 610, the input device 615, the output device 620, and the transceiver 625. In certain embodiments, the processor 805 may include an application processor (also known as "main processor") which manages application-domain and operating system ("OS") functions and a baseband processor (also known as "baseband radio processor") which manages radio function.

In various embodiments, the processor 605 and/or transceiver 625 controls the network apparatus 600 to implement the above described network apparatus behaviors. In one embodiment, the transceiver 625 sends, to a user equipment ("UE"), a channel state information ("CSI") reporting configuration, the CSI reporting configuration comprising a codebook configuration corresponding to a port selection codebook, the port selection codebook corresponding to a precoding matrix indicator ("PMI") comprising a set of one or more layers.

In one embodiment, the transceiver 625 sends, to the UE, CSI reference signals ("CSI-RSs") corresponding to a set of CSI-RS ports. In one embodiment, the transceiver 625 receives, from the UE, an indication of a selected subset of the set of CSI-RS ports in a CSI report, the indication having a form of a combinatorial function that corresponds to half of the number of the set of CSI-RS ports.

In various embodiments, the network apparatus 600 is a RAN node (e.g., gNB) that includes a transceiver 625 that sends, to a user equipment ("UE") device, an indication that channel state information ("CSI") corresponding to multiple transmit/receives points ("TRPs") is to be reported and receives at least one CSI report from the UE corresponding to one or more of the multiple TRPs, the CSI report generated according to the CSI reporting configuration, the at least one CSI report comprising a CSI-reference signal ("CSI-RS") resource indicator ("CRI").

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media.

In some embodiments, the memory 610 stores data related to codebook structure for reciprocity-based type-II codebook. For example, the memory 610 may store parameters, configurations, resource assignments, policies, and the like, as described above. In certain embodiments, the memory 610 also stores program code and related data, such as an operating system or other controller algorithms operating on the network apparatus 600.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The output device 620, in one embodiment, is designed to output visual, audible, and/or haptic signals. In some embodiments, the output device 620 includes an electronically controllable display or display device capable of outputting visual data to a user. For example, the output device 620 may include, but is not limited to, an LCD display, an LED display, an OLED display, a projector, or similar display device capable of outputting images, text, or the like to a user. As another, non-limiting, example, the output device 620 may include a wearable display separate from, but communicatively coupled to, the rest of the network apparatus 600, such as a smart watch, smart glasses, a heads-up display, or the like. Further, the output device 620 may be a component of a smart phone, a personal digital assistant, a television, a table computer, a notebook (laptop) computer, a personal computer, a vehicle dashboard, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all, or portions of the output device 620 may be integrated with the input device 615. For example, the input device 615 and output device 620 may form a touchscreen or similar touch-sensitive display. In other embodiments, the output device 620 may be located near the input device 615.

The transceiver 625 includes at least transmitter 630 and at least one receiver 635. One or more transmitters 630 may be used to communicate with the UE, as described herein. Similarly, one or more receivers 635 may be used to communicate with network functions in the NPN, PLMN and/or RAN, as described herein. Although only one transmitter 630 and one receiver 635 are illustrated, the network apparatus 600 may have any suitable number of transmitters 630 and receivers 635. Further, the transmitter(s) 630 and the receiver(s) 635 may be any suitable type of transmitters and receivers.

Figure 7:
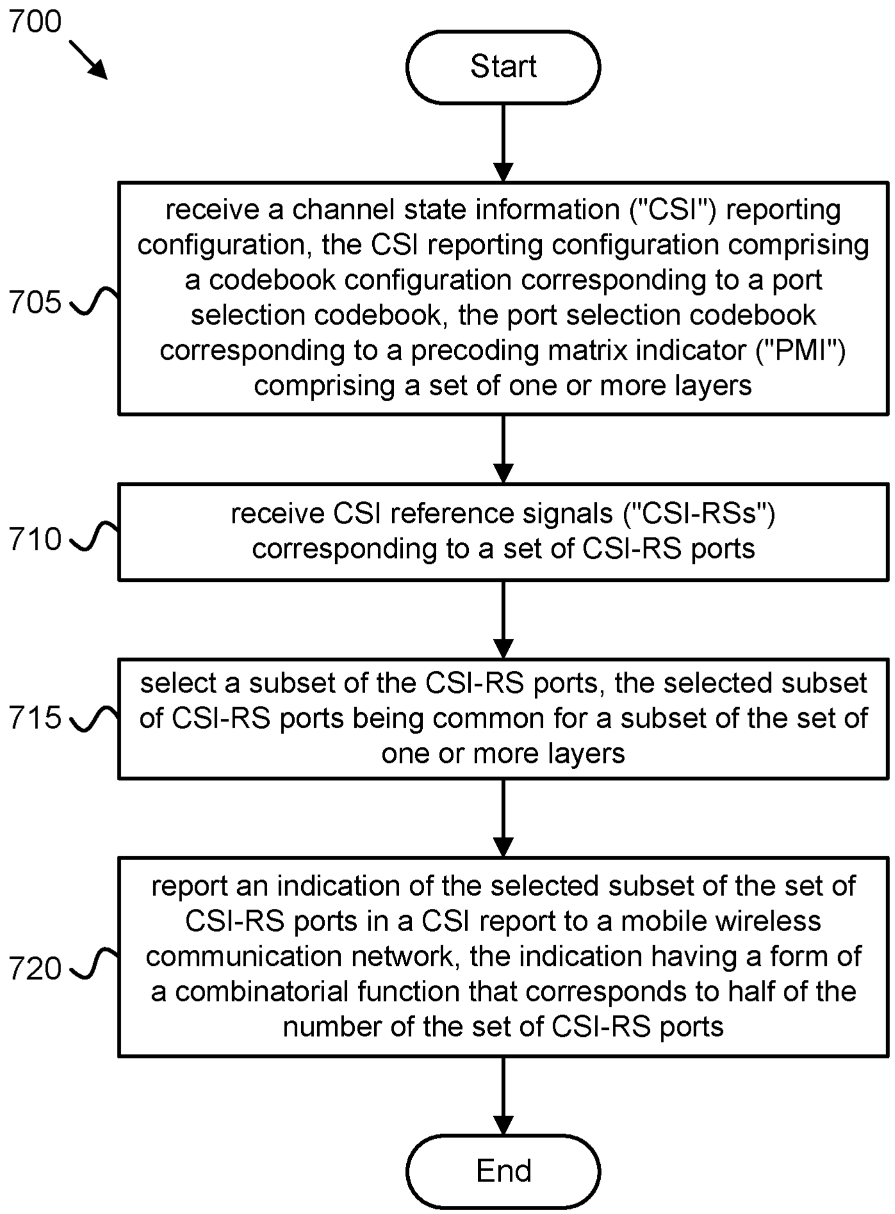
FIG. 7 is a flowchart diagram illustrating one embodiment of a method for codebook structure for reciprocity-based type-II codebook.

FIG. 7 is a flowchart diagram of a method 700 for codebook structure for reciprocity-based type-II codebook. The method 700 may be performed by a UE as described herein, for example, the remote unit 105, the UE 205 and/or the user equipment apparatus 500. In some embodiments, the method 700 may be performed by a processor executing program code, for example, a microcontroller, a microprocessor, a CPU, a GPU, an auxiliary processing unit, a FPGA, or the like.

The method 700, in one embodiment, includes receiving 705 a channel state information ("CSI") reporting configuration, the CSI reporting configuration comprising a codebook configuration corresponding to a port selection codebook, the port selection codebook corresponding to a precoding matrix indicator ("PMI") comprising a set of one or more layers. The method 700 includes receiving 710 CSI reference signals ("CSI-RSs") corresponding to a set of CSI-RS ports.

The method 700 includes selecting 715 a subset of the CSI-RS ports, the selected subset of CSI-RS ports being common for a subset of the set of one or more layers. The method 700 includes reporting 720 an indication of the selected subset of the set of CSI-RS ports in a CSI report to a mobile wireless communication network, the indication having a form of a combinatorial function that corresponds to half of the number of the set of CSI-RS ports. The method 700 ends.

Figure 8:
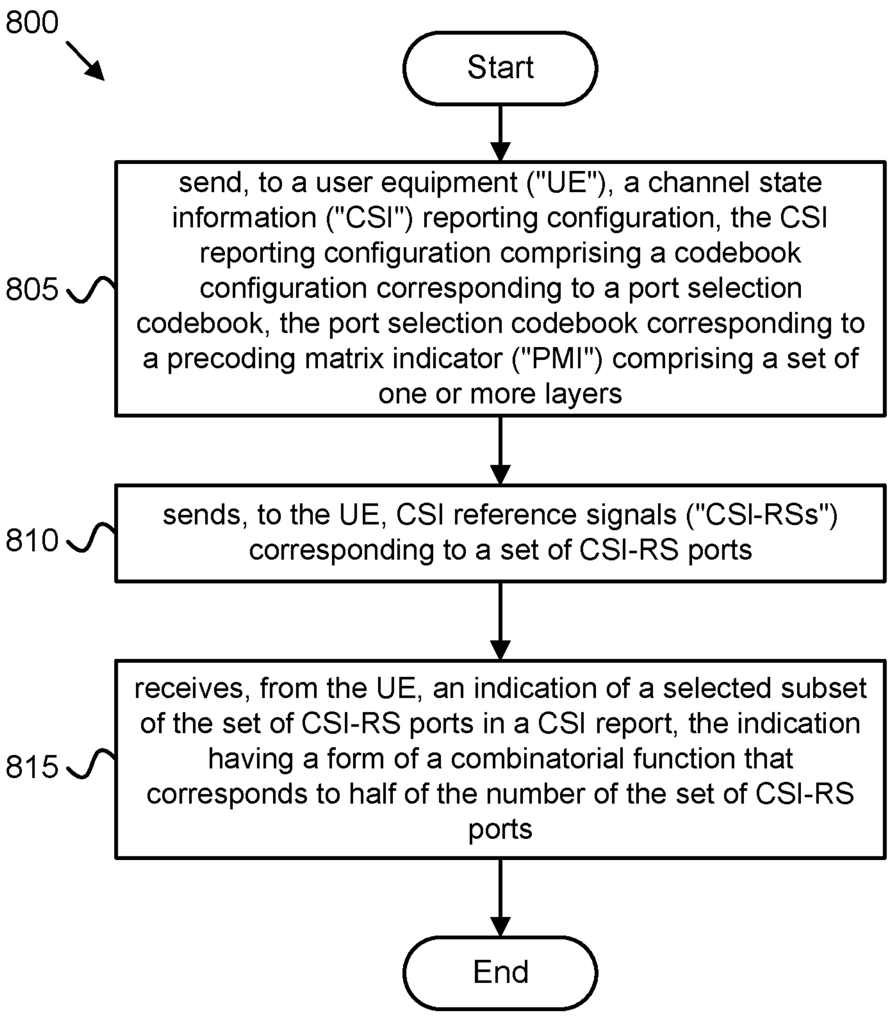
FIG. 8 is a flowchart diagram illustrating one embodiment of a method for codebook structure for reciprocity-based type-II codebook.

FIG. 8 is a flowchart diagram of a method 800 for codebook structure for reciprocity-based type-II codebook. The method 800 may be performed by a network device described herein, for example, a gNB, a base station, and/or the network equipment apparatus 600. In some embodiments, the method 800 may be performed by a processor executing program code, for example, a microcontroller, a microprocessor, a CPU, a GPU, an auxiliary processing unit, a FPGA, or the like.

In one embodiment, the method 800 includes sending 805, to a user equipment ("UE"), a channel state information ("CSI") reporting configuration, the CSI reporting configuration comprising a codebook configuration corresponding to a port selection codebook, the port selection codebook corresponding to a precoding matrix indicator ("PMI") comprising a set of one or more layers. The method 800 includes sending 810, to the UE, CSI reference signals ("CSI-RSs") corresponding to a set of CSI-RS ports. The method 800 includes receiving 815, from the UE, an indication of a selected subset of the set of CSI-RS ports in a CSI report, the indication having a form of a combinatorial function that corresponds to half of the number of the set of CSI-RS ports. The method 800 ends.

A first apparatus is disclosed for codebook structure for reciprocity-based type-II codebook may be embodied as a UE as described herein, for example, the remote unit 105, the UE 205 and/or the user equipment apparatus 500. In some embodiments, the first apparatus may include a processor executing program code, for example, a microcontroller, a microprocessor, a CPU, a GPU, an auxiliary processing unit, a FPGA, or the like.

In one embodiment, the first apparatus includes a transceiver that receives a channel state information ("CSI") reporting configuration, the CSI reporting configuration comprising a codebook configuration corresponding to a port selection codebook, the port selection codebook corresponding to a precoding matrix indicator ("PMI") comprising a set of one or more layers. In one embodiment, the transceiver receives CSI reference signals ("CSI-RSs") corresponding to a set of CSI-RS ports.

The first apparatus, in one embodiment, includes a processor that selects a subset of the CSI-RS ports, the selected subset of CSI-RS ports being common for a subset of the set of one or more layers. In one embodiment, the transceiver reports an indication of the selected subset of the set of CSI-RS ports in a CSI report to a mobile wireless communication network, the indication having a form of a combinatorial function that corresponds to half of the number of the set of CSI-RS ports.

In one embodiment, the subset of the set of one or more layers is the set of one or more layers such that the selected subset of the CSI-RS ports is common across all layers of the set of one or more layers.

In one embodiment, the subset of the set of one or more layers is the set of one or more layers such that the selected subset of the CSI-RS ports is common across all layers of the set of one or more layers.

In one embodiment, a member of the selected subset of the CSI-RS ports takes on $$\left\{0,1,\ldots,\frac{P_{CSI-RS}}{2}-1\right\}.$$

In one embodiment, the number of bits used to report the indication is calculated as $$\left\lceil \log_2\binom{P_{CSI-RS}/2}{L} \right\rceil,$$

where $P_{CSI-RS}$ is the number of CSI-RS ports and L is a size of the subset of the set of CSI-RS ports.

In one embodiment, a member of a first half of the subset of the set of CSI-RS ports takes on values from $$\left\{0,1,\ldots,\frac{P_{CSI-RS}}{2}-1\right\}.$$

and a member of a second half of the subset of the set of CSI-RS ports takes on values from $$\left\{\frac{P_{CSI-RS}}{2},\ldots,P_{CSI-RS}-1\right\}.$$

In one embodiment, the number of bits used to report the indication is 2.

$$\left\lceil \log_2\binom{P_{CSI-RS}/2}{L} \right\rceil.$$

In one embodiment, the subset of the set of one or more layers comprises one layer.

In one embodiment, the number of bits used to report the indication is $N_{layers}$.

$$\left\lceil \log_2\left(\frac{P_{CSI-RS}/2}{L}\right)\right\rceil,$$

bits, wherein $N_{layers}$ is a size of the set of one or more layers.

In one embodiment, up to two subsets of the set of one or more layers are present, a first subset corresponding to up to the first two layers of the set of one or more layers and a second subset corresponding to one or more layers subsequent to the first two layers of the set of one or more layers.

A first method is disclosed for codebook structure for reciprocity-based type-II codebook may be performed by a UE as described herein, for example, the remote unit 105, the UE 205 and/or the user equipment apparatus 500. In some embodiments, the first method may be performed by a processor executing program code, for example, a microcontroller, a microprocessor, a CPU, a GPU, an auxiliary processing unit, a FPGA, or the like.

In one embodiment, the first method includes receiving a channel state information ("CSI") reporting configuration, the CSI reporting configuration comprising a codebook configuration corresponding to a port selection codebook, the port selection codebook corresponding to a precoding matrix indicator ("PMI") comprising a set of one or more layers. In one embodiment, the first method includes receiving CSI reference signals ("CSI-RSs") corresponding to a set of CSI-RS ports.

The first method, in one embodiment, includes selecting a subset of the CSI-RS ports, the selected subset of CSI-RS ports being common for a subset of the set of one or more layers. In one embodiment, the first method includes reporting an indication of the selected subset of the set of CSI-RS ports in a CSI report to a mobile wireless communication network, the indication having a form of a combinatorial function that corresponds to half of the number of the set of CSI-RS ports.

In one embodiment, the subset of the set of one or more layers is the set of one or more layers such that the selected subset of the CSI-RS ports is common across all layers of the set of one or more layers.

In one embodiment, the subset of the set of one or more layers is the set of one or more layers such that the selected subset of the CSI-RS ports is common across all layers of the set of one or more layers.

In one embodiment, a member of the selected subset of the CSI-RS ports takes on values from $$\left\{0,1, \ldots , \frac{P_{CSI-RS}}{2} - 1\right\}.$$

In one embodiment, the number of bits used to report the indication is calculated as $$\left\lceil \log_2\left(\frac{P_{CSI-RS}/2}{L}\right)\right\rceil,$$

where $P_{CSI-RS}$ is the number of CSI-RS ports and L is a size of the subset of the set of CSI-RS ports.

In one embodiment, a member of a first half of the subset of the set of CSI-RS ports takes on values from $$\left\{0, 1, \ldots , \frac{P_{CSI-RS}}{2} - 1\right\},$$

and a member of a second half of the subset of the set of CSI-RS ports takes on values from $$\left\{\frac{P_{CSI-RS}}{2}, \ldots , P_{CSI-RS} - 1\right\}.$$

In one embodiment, the number of bits used to report the indication is 2.

$$2 \cdot \left\lceil \log_2\left(\frac{P_{CSI-RS}/2}{L}\right)\right\rceil.$$

In one embodiment, the subset of the set of one or more layers comprises one layer.

In one embodiment, the number of bits used to report the indication is $N_{layers}$ $$N_{layers} \cdot \left\lceil \log_2\left(\frac{P_{CSI-RS}/2}{L}\right)\right\rceil$$

bits, wherein $N_{layers}$ is a size of the set of the one or more layers.

In one embodiment, up to two subsets of the set of one or more layers are present, a first subset corresponding to up to the first two layers of the set of one or more layers and a second subset corresponding to one or more layers subsequent to the first two layers of the set of one or more layers.

A second apparatus is disclosed for codebook structure for reciprocity-based type-II codebook may be embodied as a network device described herein, for example, a gNB, a base station, and/or the network equipment apparatus 600. In some embodiments, the second apparatus includes a processor executing program code, for example, a microcontroller, a microprocessor, a CPU, a GPU, an auxiliary processing unit, a FPGA, or the like.

The second apparatus, in one embodiment, includes a transceiver that sends, to a user equipment ("UE"), a channel state information ("CSI") reporting configuration, the CSI reporting configuration comprising a codebook configuration corresponding to a port selection codebook, the port selection codebook corresponding to a precoding matrix indicator ("PMI") comprising a set of one or more layers.

In one embodiment, the transceiver sends, to the UE, CSI reference signals ("CSI-RSs") corresponding to a set of CSI-RS ports. In one embodiment, the transceiver receives, from the UE, an indication of a selected subset of the set of CSI-RS ports in a CSI report, the indication having a form of a combinatorial function that corresponds to half of the number of the set of CSI-RS ports.

A second method is disclosed for codebook structure for reciprocity-based type-II codebook may be performed by a network device described herein, for example, a gNB, a base station, and/or the network equipment apparatus 600. In some embodiments, the second method may be performed by a processor executing program code, for example, a microcontroller, a microprocessor, a CPU, a GPU, an auxiliary processing unit, a FPGA, or the like.

In one embodiment, the second method includes sending, to a user equipment ("UE"), a channel state information ("CSI") reporting configuration, the CSI reporting configuration comprising a codebook configuration corresponding to a port selection codebook, the port selection codebook corresponding to a precoding matrix indicator ("PMI") comprising a set of one or more layers.

In one embodiment, the second method includes sending, to the UE, CSI reference signals ("CSI-RSs") corresponding to a set of CSI-RS ports. In one embodiment, the second method includes receiving, from the UE, an indication of a selected subset of the set of CSI-RS ports in a CSI report, the indication having a form of a combinatorial function that corresponds to half of the number of the set of CSI-RS ports.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment (UE) for wireless communication, comprising:

at least one memory; and at least one processor coupled with the at least one memory and configured to cause the UE to:

receive a channel state information (CSI) reporting configuration, the CSI reporting configuration comprising a codebook configuration corresponding to a port selection codebook, the port selection codebook corresponding to a precoding matrix indicator (PMI) comprising a set of two or more layers;

receive CSI reference signals (CSI-RSs) corresponding to a set of CSI-RS ports;

select a subset of CSI-RS ports of the set of CSI-RS ports, the subset of CSI-RS ports being selected as a single common subset applicable to each layer of the set of two or more layers corresponding to a rank associated with a rank indicator value; and report a single subset indication that is common across each layer of the set of two or more layers corresponding to the rank and has a form of a combinatorial function that corresponds to half of a number of CSI-RS ports in the set of CSI-RS ports in a CSI report.

2. The UE of claim 1, wherein the CSI report further comprises one or more coefficient indicators, each coefficient indicator associated with a selected CSI-RS port of the subset of CSI-RS ports.

3. The UE of claim 1, wherein a member of the subset of CSI-RS ports of the set of CSI-RS ports takes on values from $$\left\{0, 1, \ldots, \frac{P_{CSI-RS}}{2} - 1\right\},$$

where $P_{CSI-RS}$ is a number of the CSI-RS ports in the set of CSI-RS ports.

4. The UE of claim 3, wherein a number of bits used to report the single subset indication is calculated as $$\left\lceil \log_2\left(\frac{P_{CSI-RS}}{2L}\right)\right\rceil,$$

where L is a size of the subset of CSI-RS ports of the set of CSI-RS ports.

5. The UE of claim 1, wherein a member of a first half of the subset of CSI-RS ports of the set of CSI-RS ports takes on values from $$\left\{0, 1, \ldots, \frac{P_{CSI-RS}}{2} - 1\right\},$$

and a member of a second half of the subset of CSI-RS ports of the set of CSI-RS ports takes on values from $$\left\{\frac{P_{CSI-RS}}{2}, \ldots, P_{CSI-RS} - 1\right\},$$

where $P_{CSI-RS}$ is a number of the CSI-RS ports in the set of CSI-RS ports.

6. The UE of claim 5, wherein a number of bits used to report the single subset indication is $$2 \cdot \left\lceil \log_2\left(\frac{P_{CSI-RS}}{2L}\right)\right\rceil,$$

where L is a size of the subset of CSI-RS ports of the set of CSI-RS ports.

7. The UE of claim 1, wherein a subset of layers of the set of two or more layers comprises two layers.

8. The UE of claim 7, wherein a number of bits used to report the single subset indication is $$N_{layers} \cdot \left\lceil \log_2\left(\frac{P_{CSI-RS}}{2L}\right)\right\rceil$$

bits, where $P_{CSI-RS}$ is a number of the CSI-RS ports in the set of CSI-RS ports, L is a size of the subset of CSI-RS ports of the set of CSI-RS ports, and $N_{layers}$ is a size of the set of two or more layers.

9. The UE of claim 7, wherein a number of bits used to report the single subset indication is $$2N_{layers} \cdot \left\lceil \log_2\left(\frac{P_{CSI-RS}}{2L}\right)\right\rceil$$

bits, where $P_{CSI-RS}$ is a number of the CSI-RS ports in the set of CSI-RS ports, L is a size of the subset of CSI-RS ports of the set of CSI-RS ports, and $N_{layers}$ is a size of the set of two or more layers.

10. The UE of claim 1, wherein up to two subsets of layers of the set of two or more layers are present, a first subset of layers corresponding to at least a first two layers of the set of two or more layers and a second subset of layers corresponding to one or more layers subsequent to the at least first two layers of the set of two or more layers.

11. A method performed by a user equipment (UE), the method comprising:

receiving a channel state information (CSI) reporting configuration, the CSI reporting configuration comprising a codebook configuration corresponding to a port selection codebook, the port selection codebook corresponding to a precoding matrix indicator (PMI) comprising a set of two or more layers;

receiving CSI reference signals (CSI-RSs) corresponding to a set of CSI-RS ports;

selecting a subset of CSI-RS ports of the set of CSI-RS ports, the subset of CSI-RS ports being selected as a single common subset applicable to each layer of the set of two or more layers corresponding to a rank associated with a rank indicator value; and reporting a single subset indication that is common across each layer of the set of two or more layers corresponding to the rank and has a form of a combinatorial function that corresponds to half of a number of CSI-RS ports in the set of CSI-RS ports in a CSI report.

12. The method of claim 11, wherein the CSI report further comprises one or more coefficient indicators, each coefficient indicator associated with a selected CSI-RS port of the subset of CSI-RS ports.

13. The method of claim 11, wherein a member of the subset of CSI-RS ports of the set of CSI-RS ports takes on values from $$\left\{0, 1, \dots, \frac{P_{CSI-RS}}{2} - 1\right\},$$

where $P_{CSI-RS}$ is a number of the CSI-RS ports in the set of CSI-RS ports and a number of bits used to report the single subset indication is calculated as $$\left\lceil \log_2 \begin{pmatrix} \frac{P_{CSI-RS}}{2} \\ L \end{pmatrix} \right\rceil,$$

where L is a size of the subset of CSI-RS ports of the set of CSI-RS ports.

14. The method of claim 11, wherein a member of a first half of the subset of CSI-RS ports of the set of CSI-RS ports takes on values from $$\left\{0, 1, \dots, \frac{P_{CSI-RS}}{2} - 1\right\},$$

a member of a second half of the subset of CSI-RS ports of the set of CSI-RS ports takes on values from $$\left\{\frac{P_{CSI-RS}}{2}, \dots, P_{CSI-RS} - 1\right\},$$

where $P_{CSI-RS}$ is a number of the CSI-RS ports in the set of CSI-RS ports.

15. The method of claim 14, wherein a number of bits used to report the single subset indication is $$2 \cdot \left\lceil \log_2 \begin{pmatrix} P_{CSI-RS}/2 \\ L \end{pmatrix} \right\rceil,$$

where L is a size of the subset of CSI-RS ports of the set of CSI-RS ports.

16. The method of claim 11, wherein a subset of layers of the set of two or more layers comprises two layers.

17. The method of claim 16, wherein a number of bits used to report the single subset indication is $$N_{layers} \cdot \left\lceil \log_2 \begin{pmatrix} \frac{P_{CSI-RS}}{2} \\ L \end{pmatrix} \right\rceil$$

bits, where $P_{CSI-RS}$ is a number of the CSI-RS ports in the set of CSI-RS ports, L is a size of the subset of CSI-RS ports of the set of CSI-RS ports, and $N_{layers}$ is a size of the set of two or more layers.

18. The method of claim 16, wherein a number of bits used to report the single subset indication is $$2N_{layers} \cdot \left\lceil \log_2 \begin{pmatrix} \frac{P_{CSI-RS}}{2} \\ L \end{pmatrix} \right\rceil$$

bits, where $P_{CSI-RS}$ is a number of the CSI-RS ports in the set of CSI-RS ports, L is a size of the subset of CSI-RS ports of the set of CSI-RS ports, and $N_{layers}$ is a size of the set of two or more layers.

19. A base station for wireless communication, comprising:

at least one memory; and at least one processor coupled with the at least one memory and configured to cause the base station to:

send a channel state information (CSI) reporting configuration, the CSI reporting configuration comprising a codebook configuration corresponding to a port selection codebook, the port selection codebook corresponding to a precoding matrix indicator (PMI) comprising a set of two or more layers;

send CSI reference signals (CSI-RSs) corresponding to a set of CSI-RS ports; and receive a single subset indication that is common across each layer of the set of two or more layers corresponding to a rank associated with a rank indicator value and has a form of a combinatorial function that corresponds to half of a number of CSI-RS ports in the set of CSI-RS ports in a CSI report, wherein a subset of CSI-RS ports is selected as a single common subset applicable to each layer of the set of two or more layers at the rank.

20. A method performed by a base station, the method comprising:

sending a channel state information (CSI) reporting configuration, the CSI reporting configuration comprising a codebook configuration corresponding to a port selection codebook, the port selection codebook corresponding to a precoding matrix indicator (PMI) comprising a set of two or more layers;

sending CSI reference signals (CSI-RSs) corresponding to a set of CSI-RS ports; and receiving a single subset indication that is common across each layer of the set of two or more layers corresponding to a rank associated with a rank indicator value and has a form of a combinatorial function that corresponds to half of a number of CSI-RS ports in the set of CSI-RS ports in a CSI report, wherein a subset of CSI-RS ports is selected as a single common subset applicable to each layer of the set of two or more layers at the rank.

* * * * *